(12) United States Patent
Lee et al.

(10) Patent No.: US 8,432,270 B2
(45) Date of Patent: Apr. 30, 2013

(54) MOBILE TERMINAL FOR BICYCLE MANAGEMENT AND METHOD FOR CONTROLLING OPERATION OF THE SAME

(75) Inventors: Li Na Lee, Seoul (KR); I Su Byun, Seoul (KR); Woo Jin Suh, Seoul (KR); Sang Hyuck Lee, Seoul (KR); Jee In Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 411 days.

(21) Appl. No.: 12/775,742

(22) Filed: May 7, 2010

(65) Prior Publication Data

US 2011/0133918 A1  Jun. 9, 2011

(30) Foreign Application Priority Data

Dec. 3, 2009  (KR) .......................... 10-2009-0119195

(51) Int. Cl.
*B60Q 1/00* (2006.01)
*B62H 5/00* (2006.01)
*G05D 1/02* (2006.01)

(52) U.S. Cl.
USPC ........ 340/436; 340/432; 340/990; 340/995.1; 340/426.19; 340/539.13; 701/400; 701/431; 342/450

(58) Field of Classification Search .................. 340/436, 340/432
See application file for complete search history.

(56) References Cited

U.S. PATENT DOCUMENTS

| | | | |
|---|---|---|---|
| 6,188,957 B1 * | 2/2001 | Bechtolsheim et al. ...... | 701/446 |
| 6,373,430 B1 * | 4/2002 | Beason et al. ........... | 342/357.34 |
| 6,831,598 B2 * | 12/2004 | Saint-Hilaire et al. ... | 342/357.34 |
| 6,850,188 B1 * | 2/2005 | Lee et al. ................. | 342/357.52 |
| 7,741,968 B1 * | 6/2010 | Tannenbaum et al. ... | 340/539.13 |
| 8,219,263 B2 * | 7/2012 | Takeda .............................. | 701/1 |

* cited by examiner

*Primary Examiner* — Donnie Crosland
(74) *Attorney, Agent, or Firm* — Birch, Stewart, Kolasch & Birch, LLP

(57) ABSTRACT

A mobile terminal and a method of controlling the operation of the same are provided. In the method, position information of a different bicycle user or bicycle riding course information is displayed. Riding information of the different bicycle user is displayed or the bicycle riding course information is changed according to weather or the like. The method provides a navigation screen for bicycle riding and supports prevention of bicycle theft and accident.

14 Claims, 43 Drawing Sheets

MOBILE TERMINAL FOR BICYCLE MANAGEMENT AND METHOD FOR CONTROLLING OPERATION OF THE SAME

CROSS-REFERENCE TO RELATED APPLICATION

This application claims the benefit of Korean Application No. 10-2009-0119195, filed Dec. 3, 2009 in the Korean Intellectual Property Office, the disclosure of which is incorporated herein by reference.

BACKGROUND OF THE INVENTION

1. Field of the Invention

The present invention relates to a mobile terminal and a method for controlling the operation of the same, and more particularly to a mobile terminal and a method for controlling the operation of the same, which can provide bicycle riding course information and can manage bicycle riding information or the like.

2. Description of the Related Art

A mobile terminal is a portable device having a function to perform voice and video communication, a function to receive and output information, or a function to store data. As the functionality of the mobile terminal has been diversified, a mobile terminal having various complicated functions such as a function to capture still or moving images (i.e., photographs or videos), a function to reproduce music or video files, a game function, a function to receive broadcasts, and a wireless Internet function has been implemented as an all-in-one multimedia player.

Various novel attempts have been made in terms of hardware or software to achieve more complicated functions of the mobile terminal implemented as a multimedia player. One example is provision of a user interface environment allowing the user to easily and conveniently find and select a desired function. As the mobile terminal is now considered a personal belonging expressing the user's personality, there has been demand for various interface designs such as a double-sided Liquid Crystal Display (LCD), which can be viewed from both sides, or a touch screen.

However, allocation of space for a user interface such as a keypad or a display is restricted since the mobile terminal should be designed taking into consideration mobility or portability. To efficiently use various functions provided by the mobile terminal, there is a need to control the operation of the mobile terminal using a new input scheme instead of a conventional menu structure or input scheme.

SUMMARY OF THE INVENTION

Therefore, the present invention has been made in view of the above problems, and it is an object of the present invention to provide a mobile terminal and a method for controlling the operation of the same which can provide bicycle riding course information, previous bicycle riding information, or the like.

In accordance with an aspect of the present invention, the above and other objects can be accomplished by the provision of a method for controlling operation of a mobile terminal, the method including executing a bicycle riding application, determining current position information, determining position information of a different bicycle user registered in the bicycle riding application, and displaying a navigation screen indicating the current position information or the position information of the different bicycle user on the display unit.

In accordance with another aspect of the present invention, there is provided a method for controlling operation of a mobile terminal, the method including executing a bicycle riding application, detecting impact applied to a bicycle, detecting movement of the bicycle, and outputting, when the detected impact is at a reference level or greater, a rescue request signal if the movement of the bicycle is not detected for a reference time or longer from when the impact is detected.

In accordance with another aspect of the present invention, there is provided a mobile terminal including a display unit, and a controller for determining, when a bicycle riding application is executed, current position information, determining position information of a different bicycle user registered in the bicycle riding application, and displaying a navigation screen indicating the current position information or the position information of the different bicycle user on the display unit.

In accordance with another aspect of the present invention, there is provided a mobile terminal including a wireless communication unit, and a controller for detecting, when a bicycle riding application is executed, impact applied to a bicycle, detecting movement of the bicycle, and outputting, when the detected impact is at a reference level or greater, a rescue request signal through the wireless communication unit if the movement of the bicycle is not detected for a reference time or longer from when the impact is detected.

According to the present invention, a bicycle riding application can be executed by the mobile terminal. When the bicycle riding application is executed by the mobile terminal, the mobile terminal can display bicycle riding course information or other bicycle user position information. This allows the user to select bicycle riding course information or to ride with other bicycle users, thereby improving efficiency of bicycle riding.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

The present invention will now be described in more detail with reference to the drawings.

A mobile terminal as described in this specification includes a mobile phone, a smart phone, a laptop, a digital broadcast terminal, a Personal Digital Assistant (PDA), a Portable Multimedia Player (PMP), a navigation device, or the like.

Figure 1:
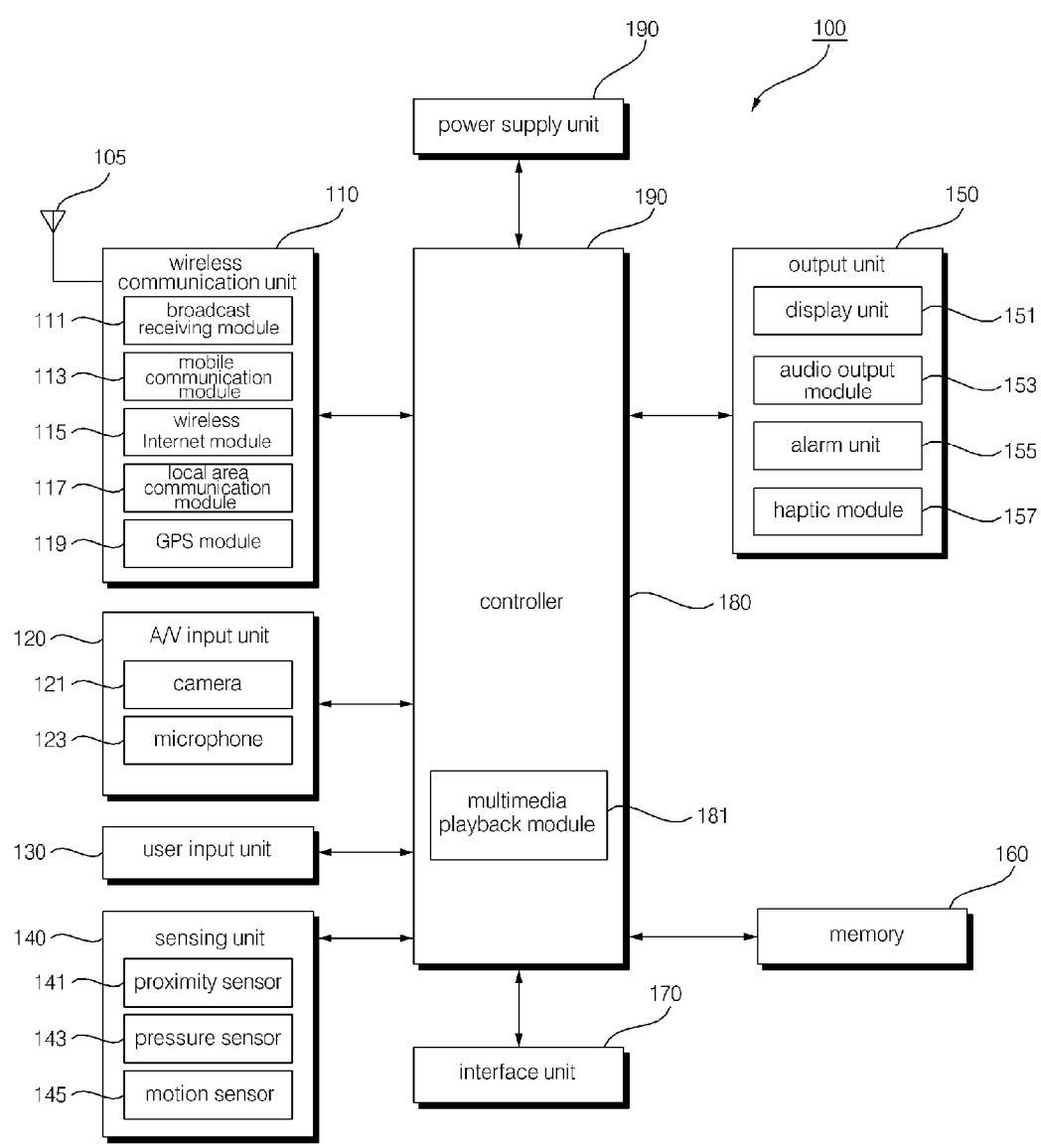
FIG. 1 is a block diagram of a mobile terminal according to an embodiment of the present invention.

The word "module" or "unit", which is added to the end of terms describing components, is merely used for ease of explanation of the present invention and imparts no specific meaning or function to the components. Thus, the words "module" and "unit" may also be used interchangeably. FIG. 1 is a block diagram of a mobile terminal according to an embodiment of the present invention. The mobile terminal according to the embodiment of the present invention is described below with reference to FIG. 1, from the viewpoint of functional components thereof.

As shown in FIG. 1, the mobile terminal 100 may include a wireless communication unit 110, an Audio/Video (AV) input unit 120, a user input unit 130, a sensing unit 140, an output unit 150, a memory 160, an interface unit 170, a controller 180, and a power supply unit 190. In actual applications, two or more of these components may be combined into one component or one component may be divided into two or more components as needed. For example, the A/V input unit 120 or the sensing unit 140 may be incorporated into the user input unit 130.

The wireless communication unit 110 may include a broadcast receiving module 111, a mobile communication module 113, a wireless Internet module 115, a local area communication module 117, and a Global Positioning System (GPS) module 119.

The broadcast receiving module 111 receives at least one of a broadcast signal and broadcast-related information from an external broadcast management server through a broadcast channel. The broadcast channel may include a satellite channel, a terrestrial channel, or the like. The broadcast management server may be a server that generates and transmits at least one of a broadcast signal and broadcast-related information or a server that receives and transmits at least one of a broadcast signal and broadcast-related information, which have been previously generated, to a terminal.

The broadcast-related information may be information relating to a broadcast channel, a broadcast program, or a broadcast service provider. The broadcast signal may not only include a TV broadcast signal, a radio broadcast signal, or a data broadcast signal but may also include a broadcast signal generated by incorporating a data broadcast signal into a TV or radio broadcast signal. The broadcast-related information may also be provided through a mobile communication network. In this case, the broadcast-related information may be received by the mobile communication module 113. The broadcast-related information may be provided in various forms. For example, the broadcast-related information may be provided in the form of a Digital Multimedia Broadcasting (DMB) Electronic Program Guide (EPG) or a Digital Video Broadcast-Handheld (DVB-H) Electronic Service Guide (ESG).

The broadcast receiving module 111 receives a broadcast signal using a variety of broadcast systems. Specifically, the broadcast receiving module 111 may receive a digital broadcast signal using a digital broadcast system such as a Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), or Integrated Services Digital Broadcast-Terrestrial (ISDB-T) system. The broadcast receiving module 111 may be configured to be suitable not only for such a digital broadcast system but also for any other broadcast system that provides a broadcast signal. A broadcast signal and/or broadcast-related information received through the broadcast receiving module 111 may be stored in the memory 160.

The mobile communication module 113 transmits and receives a wireless signal to and from at least one of a base station, an external terminal, and a server over a mobile communication network. The wireless signal may include a voice call signal, a video call signal, or various types of data associated with transmission and reception of a text/multimedia message.

The wireless Internet module 115 is an internal or external module for wireless Internet access which may be provided to the mobile terminal 100.

The wireless Internet module 115 may use a wireless Internet technology such as Wireless LAN (WLAN) (Wi-Fi), Wireless Broadband (WiBro), World Interoperability for Microwave Access (WiMAX), or High Speed Downlink Packet Access (HSDPA).

The local area communication module 117 is a module for local area communication. Here, Bluetooth, Radio Frequency Identification (RFID), Infrared Data Association (IrDA,), Ultra Wideband (UWB), or ZigBee may be used as a local area communication technology. The GPS module 119 receives location information from multiple GPS satellites.

The A/V input unit 120 is provided to input an audio or video signal and may include a camera 121 and a microphone 123. The camera 121 processes an image frame such as a still image (or photograph) or a moving image (or video) obtained through an image sensor in a video communication mode or an image capture mode. The processed picture frame may be displayed on the display unit 151.

The picture frame processed at the camera 121 may be stored in the memory 160 or may be transmitted to the outside through the wireless communication unit 110. Two more cameras 121 may be provided depending on the configuration of the mobile terminal.

The microphone 123 receives an external audio signal in a voice or video communication mode, a record mode, or a voice recognition mode and processes the same into audio data. In the voice or video communication mode, the processed audio data may be converted into a form transmittable to a mobile communication base station through the mobile communication module 113. A variety of noise removal algorithms may be used to remove noise generated in the course of receiving an external audio signal through the microphone 123.

The user input unit 130 generates key input data corresponding to a key input operation that a user has performed to control the operation of the terminal. The user input unit 130 may include a key pad, a dome switch, a (resistive/capacitive) touchpad, a jog wheel, a jog switch, a finger mouse, or the like. In the case where the touchpad forms a multilayer structure with the display unit 151 that is described later, the touchpad may be referred to as a "touch screen".

The sensing unit 140 detects a current state of the mobile terminal 100 such as whether the mobile terminal 100 is opened or closed, the position of the mobile terminal 100, or whether or not the user is in contact with the mobile terminal 100 and generates a sensing signal for controlling the operation of the mobile terminal 100. The sensing unit 140 may sense whether the mobile terminal 100 is opened or closed when the mobile terminal 100 is a slide phone. The sensing unit 140 may also be responsible for sensing functions associated with whether or not the power supply unit 190 is supplying power or whether or not the interface unit 170 is coupled to an external device.

The sensing unit 140 may include a proximity sensor 141, a pressure sensor 143, and a motion sensor 145. The proximity sensor 141 can detect presence or absence of an object that is approaching or near to the mobile terminal 100 without physical contact. The proximity sensor 141 can detect a close object using change of AC magnetic fields or change of magnetostatic fields or using the rate of change of capacitance.

Two or more proximity sensors 141 may be provided depending on the configuration of the mobile terminal.

The pressure sensor 143 can detect both whether or not pressure has been applied to the mobile terminal 100 and the magnitude of the pressure. The pressure sensor 143 may be mounted on the mobile terminal 100 at a portion thereof where there is a need to detect pressure depending on the use environment of the mobile terminal 100. When the pressure sensor 143 is mounted on the display unit 151, the pressure sensor 143 can discriminate between a normal touch input through the display unit 151 and a pressure touch input which applies greater pressure than that of the normal touch input according to a signal output from the pressure sensor 143 to the display unit 151. When pressure has been applied to the display unit 151 through a pressure input touch, the pressure sensor 143 can also determine the magnitude of the pressure applied to the display unit 151 according to the signal output from the pressure sensor 143.

The motion sensor 145 detects the position or movement of the mobile terminal 100 using an acceleration sensor, a gyro sensor, and the like. The acceleration sensor that may be used for the motion sensor 145 is an element which converts acceleration in one direction into an electrical signal and has been widely used along with the development of micro-electromechanical system (MEMS) technologies. There are various types of acceleration sensors including an acceleration sensor for measuring large values of acceleration, which is embedded in an airbag system of a vehicle to detect collision, and an acceleration sensor for measuring small values of acceleration, which recognizes minute movement of a human hand and thus is used as an input means for games or the like. The acceleration sensor is generally constructed by incorporating two or three-axis elements into one package and may need only the z-axis element depending on the use environment. Thus, when there is a need to use an x-axis or y-axis acceleration sensor instead of the z-axis sensor for some reason, the acceleration sensor may be incorporated into a sub-board which is mounted at right angles to a main board.

The gyro sensor is a sensor for measuring angular velocity and can detect the current direction rotated relative to a reference direction.

The output unit 150 is provided to output an audio or video signal or an alarm signal and may include a display unit 151, an audio output module 153, an alarm unit 155, and a vibrating module 157.

The display unit 151 displays information processed in the mobile terminal 100. For example, when the mobile terminal 100 is in a voice or video communication mode, the display unit 151 displays a communication-related User Interface (UI) or Graphical User Interface (GUI). When the mobile terminal 100 is in a video communication mode or an image capture mode, the display unit 151 may individually or simultaneously display captured or received images and may display a corresponding UI or GUI.

In the case where the display unit 151 forms a multilayer structure with the touchpad to construct a touch screen as described above, the display unit 151 may not only be used as an output device but may also be used as an input device. In the case where the display unit 151 constructs a touch screen, the display unit 151 may include a touch screen panel, a touch screen panel controller, or the like. The touch screen panel is a transparent panel externally attached to the mobile terminal 100 and may be connected to an internal bus of the mobile terminal 100. The touch screen panel monitors touches and sends, upon detecting a touch input, corresponding signals to the touch screen panel controller. The touch screen panel controller processes the signals and transmits the resulting data to the controller 180 and the controller 180 then determines whether or not a touch input has occurred and which region of the touch screen has been touched.

The display unit 151 may include electronic paper (e-Paper). The e-Paper is a type of reflective display and has excellent visual characteristics such as high resolution, a wide viewing angle, and a bright white background, similar to conventional paper and ink. The e-Paper may be formed on any substrate such as plastic, metal, or paper and maintains a displayed image after power is turned off and can lengthen battery lifetime of the mobile terminal 100 since it does not require a backlight. The e-Paper may be formed using an electrostatically charged hemispherical twist ball or may be formed using electrophoresis or microcapsules.

The display unit 151 may include at least one of a liquid crystal display, a thin film transistor-liquid crystal display, an organic light-emitting diode, a flexible display, a transparent display, and a 3D display. Two or more display units 151 may be provided depending on the implementation of the mobile terminal 100. For example, both an external display unit (not shown) and an internal display unit (not shown) may be provided to the mobile terminal 100.

The audio output module 153 outputs audio data received from the wireless communication unit 110 or stored in the memory 160 when the mobile terminal 100 is in an incoming call receiving mode (i.e., a ringing mode), a voice or video communication mode, a record mode, a voice recognition mode, or a broadcast receiving mode. The audio output module 153 outputs audio signals associated with functions performed by the mobile terminal 100, for example, an audio signal associated with an incoming call sound (i.e., ringtone) or a message receipt sound. The audio output module 153 may include a speaker, a buzzer, or the like.

The alarm unit 155 outputs a signal notifying the user that an event has occurred in the mobile terminal 100. Examples of the event occurring in the mobile terminal 100 include incoming call reception, message reception, and key signal input. The alarm unit 155 outputs a signal notifying the user of the occurrence of an event in a different form from the audio or video signal. For example, the alarm unit 155 may output the notification signal through vibration. When an incoming call signal is received or when a message is received, the alarm unit 155 may output a signal indicating the reception of the incoming call signal or the message. When a key signal is input, the alarm unit 155 may output a signal as a feedback to the key signal input. The user can perceive the event occurrence through the signal output from the alarm unit 155. Of course, the signal indicating the event occurrence may also be output through the display unit 151 or the audio output module 153.

The haptic module 157 generates a variety of tactile effects that are sensible by the user. A typical example of the tactile effect generated by the haptic module 157 is vibration. In the case where the haptic module 157 generates vibration as a tactile effect, the haptic module 157 may change the intensity and pattern of generated vibration, may combine different vibrations and output the combined vibration, and may also sequentially output different vibrations.

In addition to vibration, the haptic module 157 may generate various tactile effects such as a stimulus effect by an arrangement of pins that move perpendicular to the touched skin surface, a stimulus effect by air blowing or suction through an air outlet or inlet, a stimulus effect through brushing of the skin surface, a stimulus effect through contact with an electrode, a stimulus effect using electrostatic force, and a stimulus effect through reproduction of thermal (cool/warm) sensation using an endothermic or exothermic element. The haptic module 157 may be implemented so as to allow the user to perceive such effects not only through direct tactile sensation but also through kinesthetic sensation of fingers, hands, or the like of the user. Two or more vibration modules 157 may be provided depending on the mode of implementation of the mobile terminal 100.

The memory 160 may store a program for processing and control by the controller 180 and may function to temporarily store input or output data items (for example, a phonebook, messages, still images, and moving images).

The memory 160 may include a storage medium of at least one of a variety of types including a flash memory type, a hard disk type, a multimedia card micro type, a card memory type (for example, SD or XD memory), RAM, and ROM. The mobile terminal 100 may utilize cloud storage that performs a storage function of the memory 160 over the Internet.

The interface unit 170 functions to interface with all external devices connected to the mobile terminal 100. Examples of the external devices connected to the mobile terminal 100 include a wired/wireless headset, an external battery charger, a wired/wireless data port, a memory card, a card socket such as an SIM/UIM card socket, an audio Input/Output (I/O) terminal, a video I/O terminal, and an earphone. The interface unit 170 may receive power or data from such an external device and provide the same to each internal component of the mobile terminal 100 and may transmit internal data of the mobile terminal 100 to the external device.

When the mobile terminal 100 is connected to an external cradle, the interface unit 170 may be used as a channel through which the connected cradle supplies power to the mobile terminal 100 or a channel through which a variety of command signals input to the cradle by the user are transferred to the mobile terminal 100.

The controller 180 generally controls the operation of each component to control the overall operation of the mobile terminal 100. For example, the controller 180 performs control and processing associated with voice communication, data communication, video communication, and the like. The controller 180 may include a multimedia playback module 181 for multimedia reproduction. The multimedia playback module 181 may be implemented by hardware in the controller 180 or may be implemented by software separately from the controller 180.

Under control of the controller 180, the power supply unit 190 receives external power or internal power and supplies power required for operation to each component.

The mobile terminal 100 may be constructed to be operable in any of a variety of communication systems including a wired/wireless communication system and a satellite-based communication system in which data can be transmitted through frames or packets.

Figure 2:
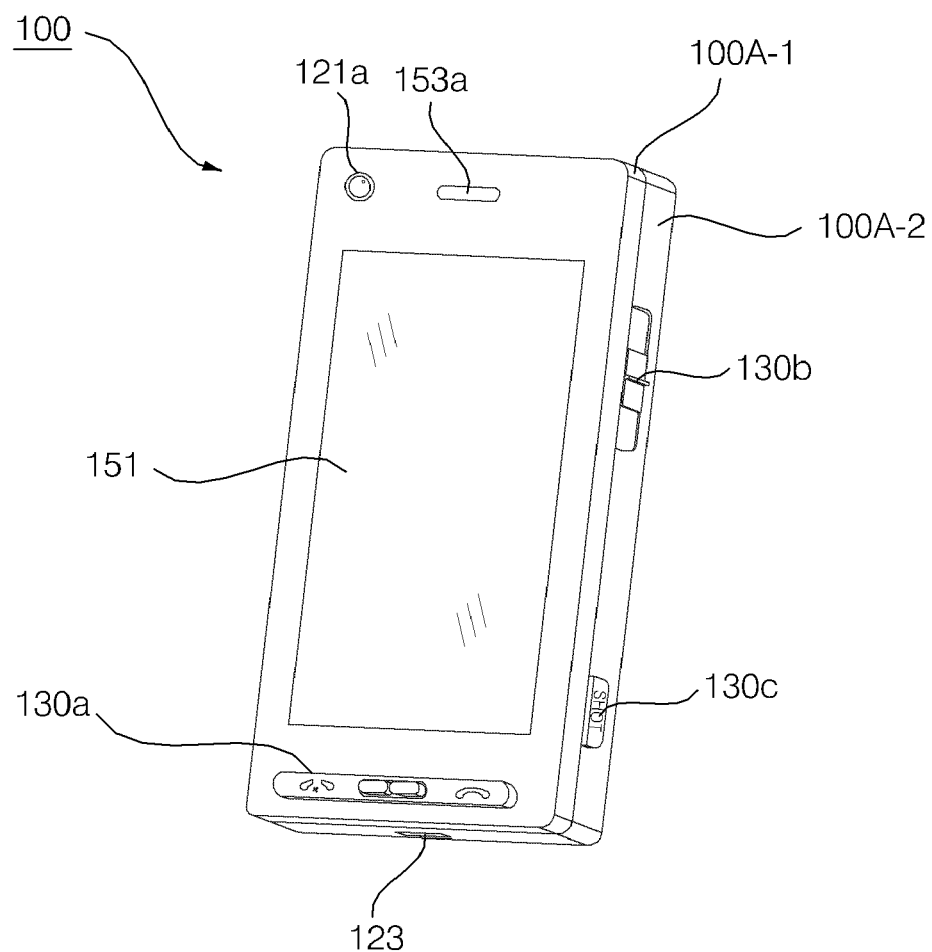
FIG. 2 is a front perspective view of a mobile terminal according to an embodiment of the present invention.

FIG. 2 is a front perspective view of a mobile terminal according to an embodiment of the present invention. As shown in FIG. 2, the mobile terminal of this embodiment includes a first body 100A and a second body 100B that is coupled to the first body 100A such that the second body 100B can slide in at least one direction.

A state of the mobile terminal 100 in which the first body 100A is arranged so as to overlap the second body 100B can be referred to as a "closed configuration" and a state of the mobile terminal 100 in which the first body 100A is arranged so as to expose at least part of the second body 100B can be referred to as an "open configuration".

The mobile terminal 100 generally operates in a standby mode when the mobile terminal 100 is in the closed configuration. However, in the closed configuration, the standby mode of the mobile terminal 100 may be released in response to user operation. The mobile terminal 100 generally operates in a communication mode when the mobile terminal 100 is in the open configuration. However, in the open configuration, the mobile terminal 100 may be switched to the standby mode in response to user operation or when a predetermined time has elapsed after the mobile terminal 100 is opened.

A case defining the external appearance of the first body 100A includes a first front case 100A-1 and a first rear case 100A-2. A variety of electronic parts are provided in a space defined within the front and rear cases 100A-1 and 100A-2. At least one intermediate case may be additionally provided between the front case 100A-1 and the rear case 100A-2. These cases may be formed through synthetic resin injection molding may be formed of a metal material such as stainless steel (STS) or titanium (Ti).

A display unit 151, a first audio output module 153a, a first camera 121a, and a first user input unit 130a may be arranged in a main body of the first body 100A, specifically, in the front case 100A-1.

The display unit 151 includes a Liquid Crystal Display (LCD), Organic Light Emitting Diodes (OLED), or the like to visually express information. A touchpad may be formed in a layered structure overlapping the display unit 151 such that the display unit 151 operates as a touch screen allowing the user to input information through touching.

Similar to the first body 100A, a case defining the external appearance of the second body 100B includes a second front case 100B-1 and a second rear case 100B-2. A second user input unit 130b may be provided on the second body 100B, specifically, on a front face of the second front case 100B-1. Third and fourth user input units 130c and 130d, a microphone 123, and an interface unit 170 may be provided on at least one of the second front case 100B-1 or the second rear case 100B-2.

The first to fourth user input units 130a, 130b, 130c, and 130d may be collectively referred to as a user input unit 130. The user input unit 130 may be of any type, provided that the user input unit 130 is operated in a tactile manner such that it is operated through tactile interaction with the user.

For example, the user input unit 130 may be implemented as a dome switch or a touchpad that can receive a command or information through a push or touch operation by the user. The user input unit 130 may also be implemented as a jog wheel or a joystick.

In terms of functionality, the first user input unit 130a allows the user to input a command such as start, end, or send and the second user input unit 130b allows the user to input numbers, characters or symbols. Each of the third and fourth user input units 130c and 130d may function as a hot key for activating a special function of the mobile terminal 100.

Figure 3:
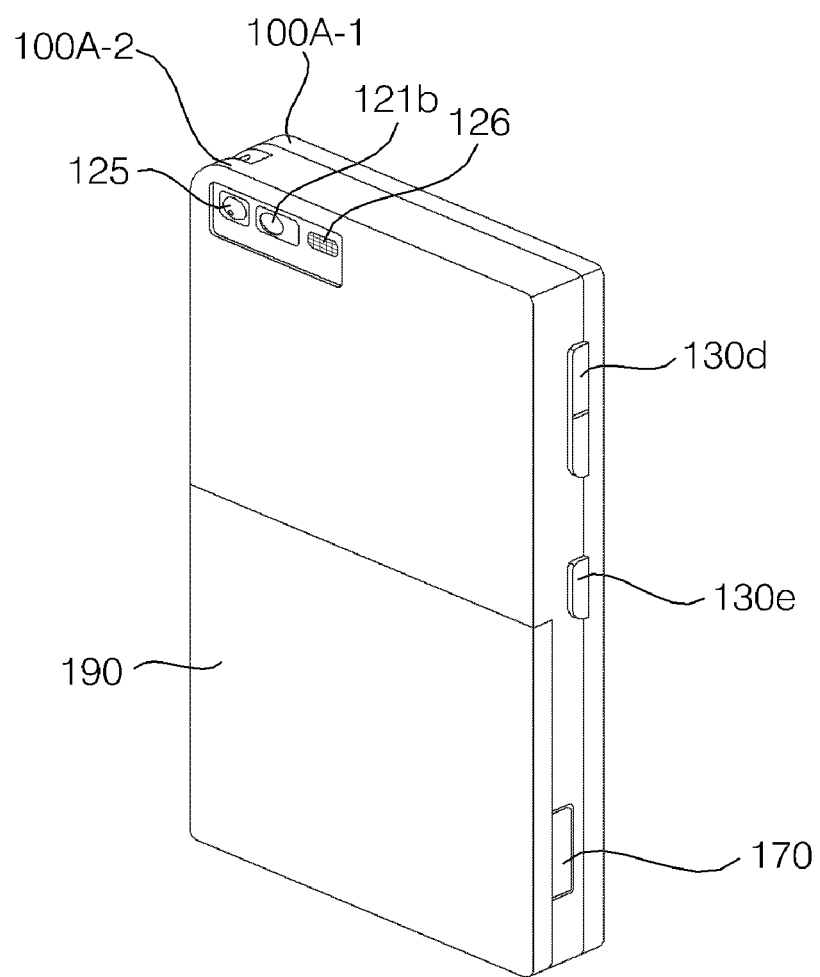
FIG. 3 is a rear perspective view of a mobile terminal according to an embodiment of the present invention.

FIG. 3 is a rear perspective view of the mobile terminal shown in FIG. 2. As shown in FIG. 3, a fifth user input unit 130e, which is a jog-wheel type input unit, and a second camera 121b may be additionally provided on a rear face of the second rear case 100A-2 of the second body 100B and a sixth user input unit 130f may be provided on a side face of the second body 100B.

The second camera 121b may have a capture direction substantially opposite to that of the first camera 121a and have a different pixel resolution from that of the first camera 121a. For example, the first camera 121a preferably has a low pixel resolution such that it is suitable to capture and transmit an image of the face of the user, for example, in the case of video communication and the second camera 121b preferably has a high pixel resolution since, when the user captures a general object using the second camera 121b, the user generally does not immediately transmit the captured image.

A mirror 125 and a flash lamp 126 may be additionally provided on the mobile terminal 100 near the second camera 121*b*. The mirror 125 allows the user to view their face or the like when capturing themselves using the second camera 121*b* (i.e., in the case of self-shooting). The flash lamp 126 shines light toward a subject when the subject is captured using the second camera 121*b*.

A second audio output module (not shown) may be additionally provided on the rear case 100A-2. The second audio output module may implement a stereo function in conjunction with the first audio output module 153*a* and may be used to perform voice or video communication in a speakerphone mode.

In addition to an antenna for communication, an antenna for receiving broadcast signals (not shown) may be provided on the rear case 100A-2 at a portion thereof. Each antenna may be mounted to be retractable from the rear case 100A-2. One portion of a slide module 100C, which slidably couples the first body 100A and the second body 100B, is provided on the first rear case 100A-2 of the first body 100A. Another portion of the slide module 100C may be provided on the second front case 100B-1 of the second body 100B so as not to be exposed as shown in FIG. 3.

Although the above description has been given with reference to an example where the second camera 121*b* is arranged on the second body 100B, the present invention is not limited to this example. For example, at least one of the components such as the second camera 121*b*, which are arranged on the second rear case 100B-2 in the above example, may be arranged on the first body 100A, typically, on the first rear case 100A-2. This arrangement has an advantage in that the components arranged on the first rear case 100A-2 are protected by the second body 100B when the mobile terminal 100 is in the closed configuration. In addition, when the second camera 121*b* is not provided, the first camera 121*a* may be formed to be rotatable so as to enable capturing in the same capture direction as that of the second camera 121*b*.

A power supply unit 190 for supplying power to the mobile terminal 100 is provided on the rear case 100A-2. The power supply unit 190 is, for example, a rechargeable battery which is detachably mounted to the rear case 100A-2 for the purpose of recharging or the like.

Figure 4:
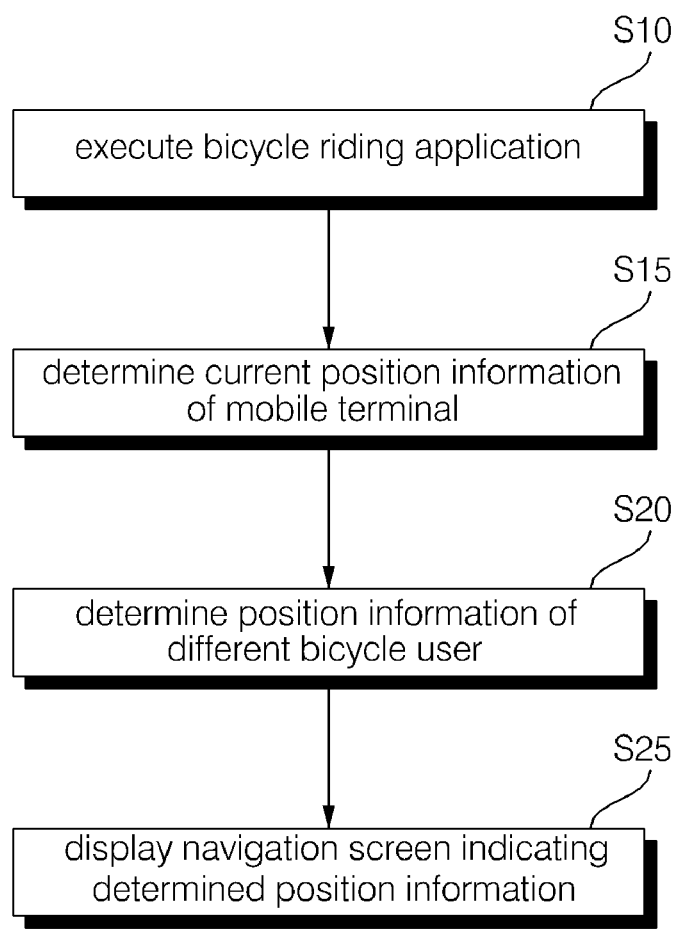
FIG. 4 is a flow chart illustrating a method for controlling the operation of a mobile terminal according to an embodiment of the present invention.

FIG. 4 is a flow chart used to explain a method for controlling the operation of a mobile terminal according to an embodiment of the present invention. As shown in FIG. 4, a user executes a bicycle riding application after installing a mobile terminal on a bicycle which is to be used (S10). The bicycle riding application of this embodiment conceptually includes an application used for bicycle riding management. In one example, the user can check desired riding course information by executing the bicycle riding application before riding the bicycle. In another example, the user can check information regarding a previous bicycle riding record before riding the bicycle. The information regarding the previous bicycle riding record may include information regarding a course which the user has previously ridden, a riding distance, weather, time, etc., associated with the previous ride.

In another example, the user may be provided with information regarding a course which deserves to ride based on current weather, current position, or the like. In another example, the user may be provided with information regarding a different bicycle user who is located at a different place. In this case, the different bicycle user may be a bicycle user who has been registered in the bicycle riding application. In another example, the user may call a virtual bicycle user stored in the mobile terminal so that the user can ride the bicycle in an environment in which the user experiences the sensation of riding the bicycle with the virtual bicycle user.

In another example, the user may call information regarding a bicycle repair record or the like. Through the called information, the user can check date and costs of maintenance and repair of the bicycle. In another example, the user may set a bicycle anti-theft lock function. A mobile terminal on which the anti-theft function has been set can detect whether or not a bicycle on which the mobile terminal is installed has moved and can output a warning sound or message when the bicycle has moved. The warning message may be output through the wireless communication unit 110.

In another example, the user may set an accident prevention function. A mobile terminal in which the accident prevention function has been set detects external impact applied to a bicycle on which the mobile terminal is installed. When the detected external impact is equal to or greater than a reference level, the mobile terminal detects whether or not the bicycle has moved for a predetermined time after the detection of the external impact. The mobile terminal may output a rescue sound or message when movement of the mobile terminal 100 is not detected for a predetermined time after the detection of the external impact. The rescue message may be output through the wireless communication unit 110.

When the bicycle riding application of this embodiment is executed, the controller 180 determines current position information of the mobile terminal (S15). The current position information of the mobile terminal can be determined through the GPS module 119.

In addition, when the bicycle riding application of this embodiment is executed, the controller 180 determines position information of a different bicycle user (S20). The different bicycle user may be one registered by the user of the mobile terminal 100. In this case, the controller 180 transmits and receives signals to and from a mobile terminal installed on a bicycle of the different bicycle user through the mobile terminal 100. The controller 180 determines the position of the mobile terminal installed on the bicycle of the different bicycle user from the transmitted and received signals. The different bicycle user may be a virtual user. The controller 180 may generate position information of the virtual user randomly or according to the position information of the bicycle on which the mobile terminal 100 is installed.

The controller 180 of the mobile terminal may display the determined position information on a navigation screen (S25). The navigation screen may display the position information of the bicycle on which the mobile terminal 100 is installed. The navigation screen may be a map screen that may indicate riding course information of the bicycle on which the mobile terminal 100 is installed. The navigation screen may also be a screen that includes a virtual reality corresponding to riding course information or a region in which the bicycle with the mobile terminal 100 installed thereon is located. The position of the bicycle, on which the mobile terminal 100 is installed, or the position of another bicycle may be displayed on the navigation screen, i.e., on the virtual reality screen or the map screen which indicates bicycle riding course information or the like.

FIGS. 5*a* to 5*d* illustrate screens displayed on a mobile terminal according to a second embodiment of the present invention.

Figure 5A:
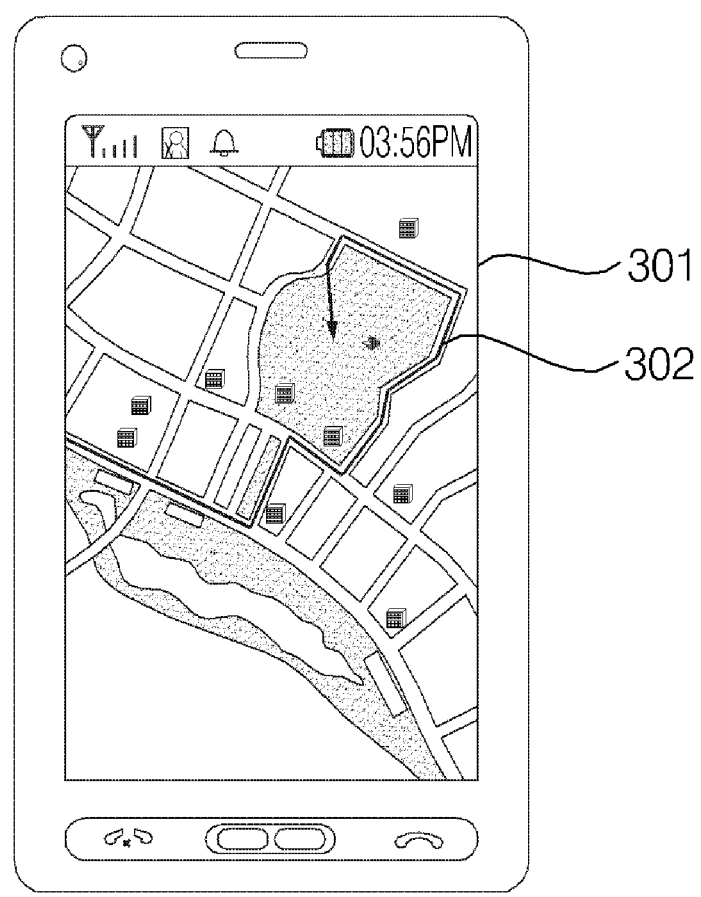
FIGS. 5 to 25 illustrate screens displayed on a mobile terminal which are used to explain a method for controlling the operation of the mobile terminal according to embodiments of the present invention.

When an event to execute the bicycle riding application has occurred, the controller 180 displays a navigation screen on the display unit 151 as shown in FIG. 5*a*. In this embodiment, the navigation screen is a map screen 301 displayed on the display unit 151. The controller 180 may display bicycle riding course information 302 as a solid line on the map screen 301.

Figure 5B:
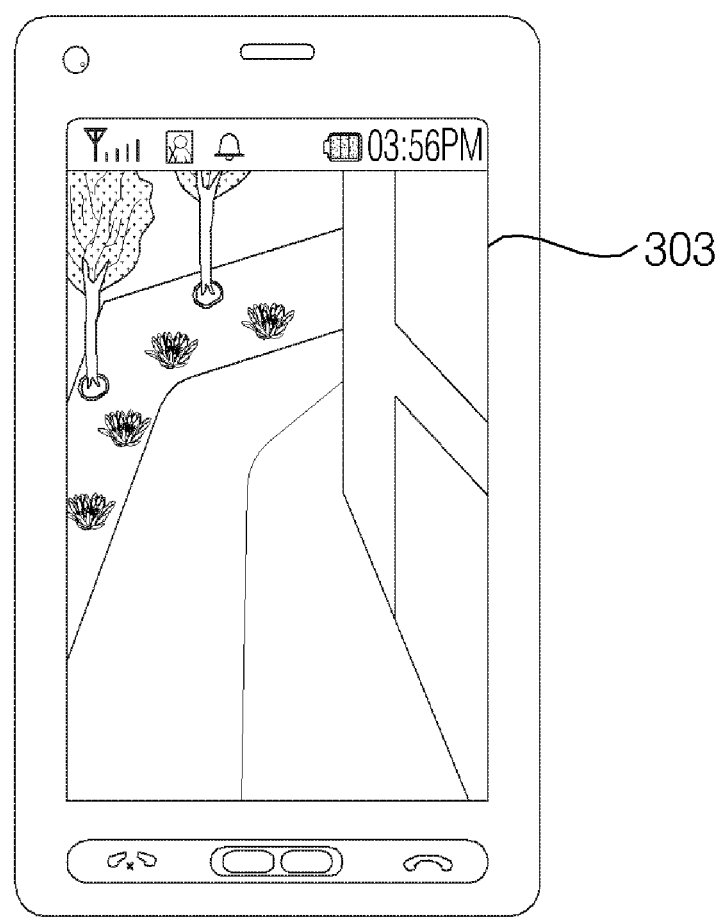

In another example, when an event to execute the bicycle riding application has occurred, the controller 180 may display a screen 303 obtained by capturing a surrounding environment on the display unit 151 as shown in FIG. 5*b*. If the user inputs, to the mobile terminal, a command to display a surrounding environment of a different bicycle user registered in the bicycle riding application, then the controller 180 may display, on the display unit 151, a surrounding environment of a bicycle of the different bicycle user captured by a mobile terminal installed on the bicycle of the different user.

In this embodiment, the different bicycle user may be a second user who bicycles with the user of the mobile terminal of the present invention. The second user may bicycle in the same place as the user of the mobile terminal of the present invention or may bicycle in a different place. In the case where the second user bicycles in a different place, the controller 180 of this embodiment may display a surrounding environment of the different place on the display unit 151. Accordingly, even when the user of the mobile terminal 100 rides the bicycle alone, the user can be aware of a surrounding situation or riding information of the second user.

Figure 5C:
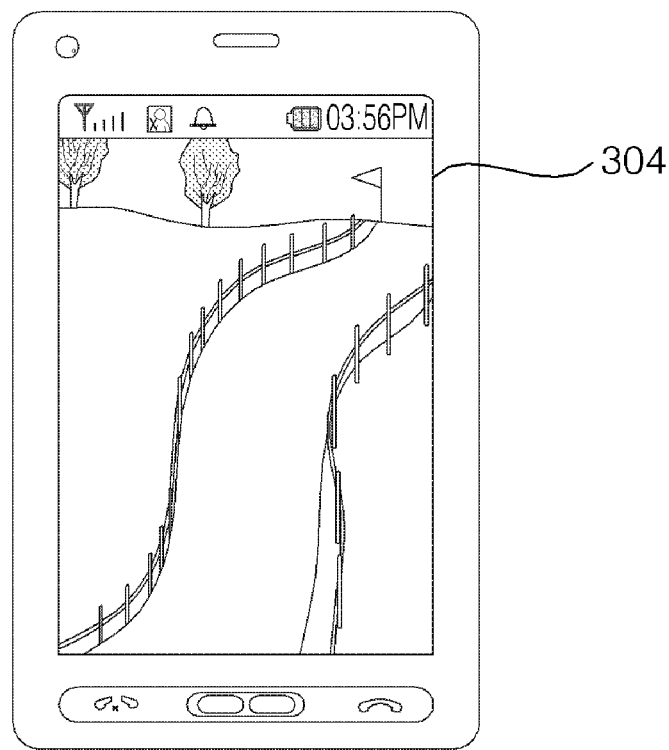

In FIG. 5*c*, the controller 180 may display, on the display unit 151, a screen 304 including a virtual reality corresponding to a course which the bicycle on which the mobile terminal 100 is installed will travel. In this embodiment, even when the user rides the bicycle in the middle of a city, the controller 180 may display a screen 304, which displays a rural area, so that the user has the sensation of riding a desired course, on the display unit 151.

In this embodiment, the screen displayed on the display unit 151 corresponds to a course which the bicycle travels. In the case where the bicycle on which the mobile terminal 100 is installed travels a linear course, a virtual reality screen including a linear course is displayed on the display unit 151. In the case where the bicycle on which the mobile terminal 100 is installed travels a curved course, a virtual reality screen including a curved course is displayed on the display unit 151.

Figure 5D:
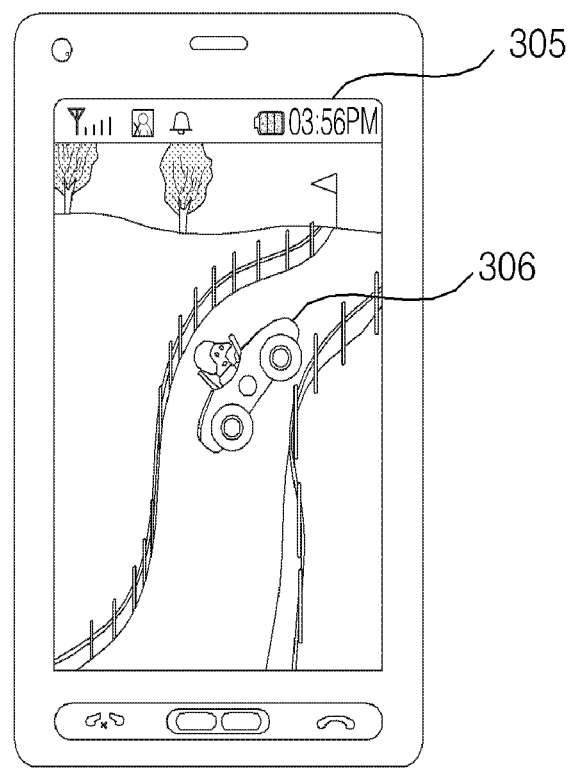

In FIG. 5*d*, the controller 180 may display a virtual user 306 on a virtual reality screen 305. Accordingly, the user of the mobile terminal 100 can have the sensation of bicycling with the virtual user 306 even when the user bicycles alone. The user may change a riding distance, speed, and the like of the virtual user 306. A riding distance, speed, and the like of the virtual user 306 set by the user may be reflected in the virtual reality screen 305. Accordingly, the user may set a riding distance, speed, and the like of the virtual user 306 and may also ride the bicycle according to the set riding distance, speed, and the like.

In this embodiment, the controller 180 may display, on the display unit 151, an avatar corresponding to a different mobile terminal user that has been registered as a user with whom the user bicycles. The controller 180 may display information regarding riding distance, speed, and the like of the different mobile terminal user on the display unit 151.

In this embodiment, the controller 180 may display, as text or an image, information regarding riding distance, speed, and the like of a virtual user or a different mobile terminal user on the display unit 151. In this case, the information regarding the riding distance, speed, and the like of the virtual user or the different mobile terminal user may be displayed on part of the navigation screen. The user may adjust their riding distance, speed, and the like based on the information displayed as text or an image.

The bicycle riding application may be executed when the user installs the mobile terminal on the bicycle. The bicycle riding application may also be executed when the user inputs a command to execute the bicycle riding application to the mobile terminal.

The bicycle riding application executed on the mobile terminal of this embodiment may provide a bicycle riding guide screen to the user of the mobile terminal. The bicycle riding guide screen may include a notification window indicating information regarding an appropriate bicycle riding speed, riding time, riding distance, and the like. The user may compare the current bicycle riding speed, riding time, riding distance, or the like of the user with the appropriate bicycle riding speed, riding time, riding distance, or the like. The user may refer to the result of the comparison when riding the bicycle.

In addition, the bicycle riding guide screen may correspond to the result of the comparison of the current bicycle riding speed, riding time, riding distance, or the like of the user with the appropriate bicycle riding speed, riding time, riding distance, or the like. In an example, when the current riding speed of the user is less than the appropriate riding speed, the bicycle riding guide screen may change the color of the screen or the shape of the virtual user to prompt the user to increase the riding speed. Through the change of the bicycle riding guide screen, the user can intuitively control the riding speed, riding time, or riding distance of the bicycle of the user.

FIGS. 6*a* to 6*d* illustrate screens displayed on a mobile terminal according to a third embodiment of the present invention.

In FIG. 6, the user may execute a bicycle diary program which is one of a variety of bicycle riding applications. The bicycle diary program may be a program that records information regarding costs spent in association with maintenance and repair of the bicycle or information regarding bicycle management status. The user may update a bicycle management program through the Internet connected to the mobile terminal 100. The user may manage the bicycle according to information provided through the bicycle management program.

Figure 6A:
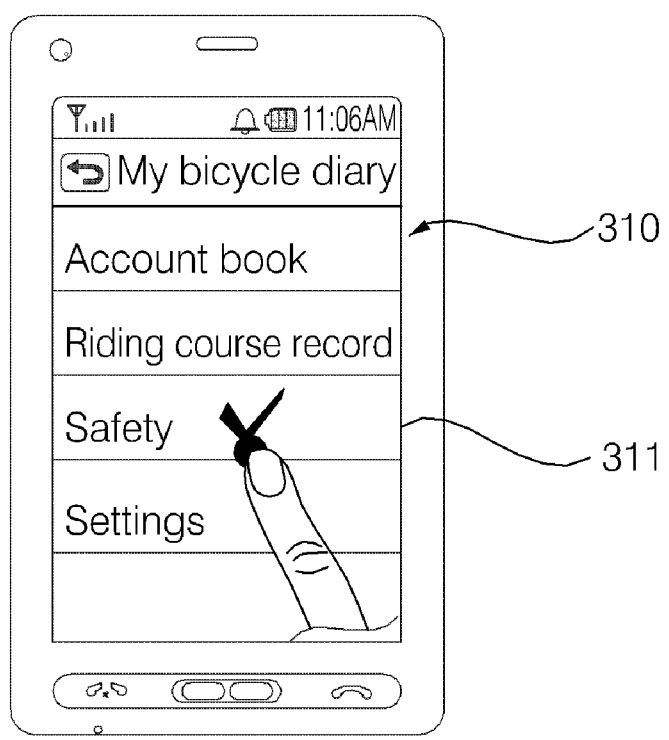

As shown in FIG. 6*a*, the controller 180 may display a bicycle diary program screen 310 on the display unit 151. The bicycle diary program screen 310 of this embodiment includes an item that enables recording of costs spent in association with bicycle maintenance and repair, an item that enables recording of bicycle riding course information, an item that enables checking of bicycle safety details, and an item that enables setting of preferences of the bicycle diary program.

Figure 6B:
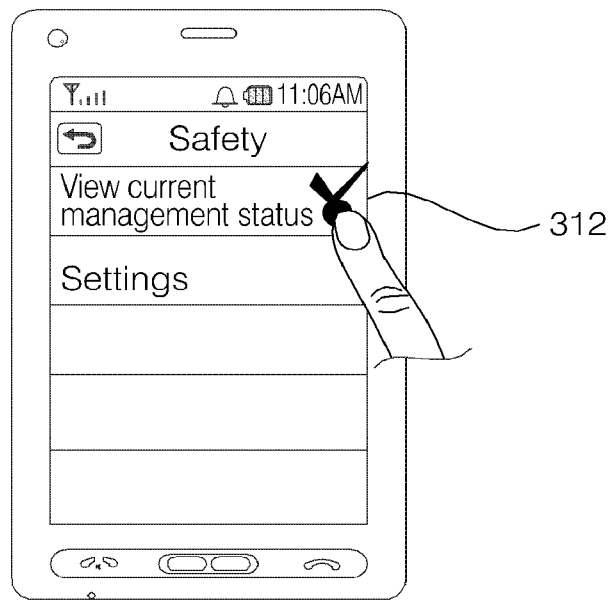

In this embodiment, when the user has selected an item 311 that enables checking of bicycle safety details, the controller 180 may display a submenu screen of the bicycle safety details check item 311 on the display unit 151 as shown in FIG. 6*b*. The user may select an item 312 that enables checking of a current bicycle management status among submenu items displayed on the display unit 151.

Figure 6C:
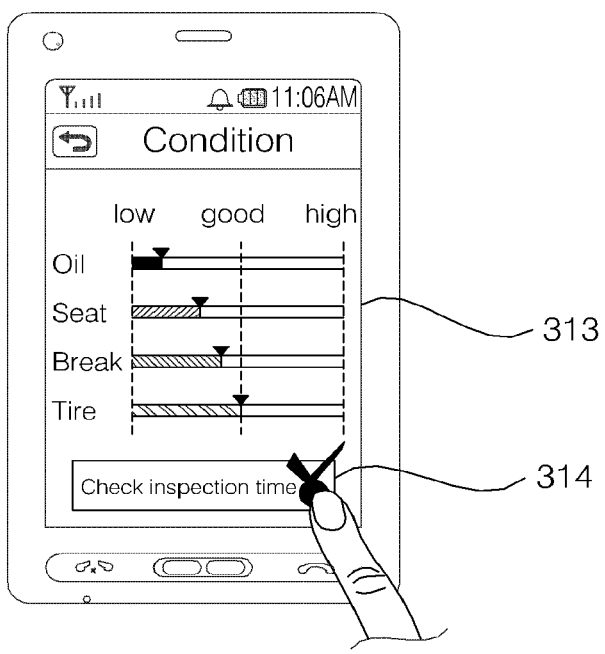

When the user has selected the current bicycle management status check item 312 as shown in FIG. 6*b*, the controller 180 displays a screen 313 indicating the current bicycle management status on the display unit 151 as shown in FIG. 6*c*. In this embodiment, the controller 180 displays states of the bicycle such as an oil status, a seat status, a brake status, and a tire status. The user may input a command to check the bicycle inspection time by selecting an inspection time check icon 314.

Figure 6D:
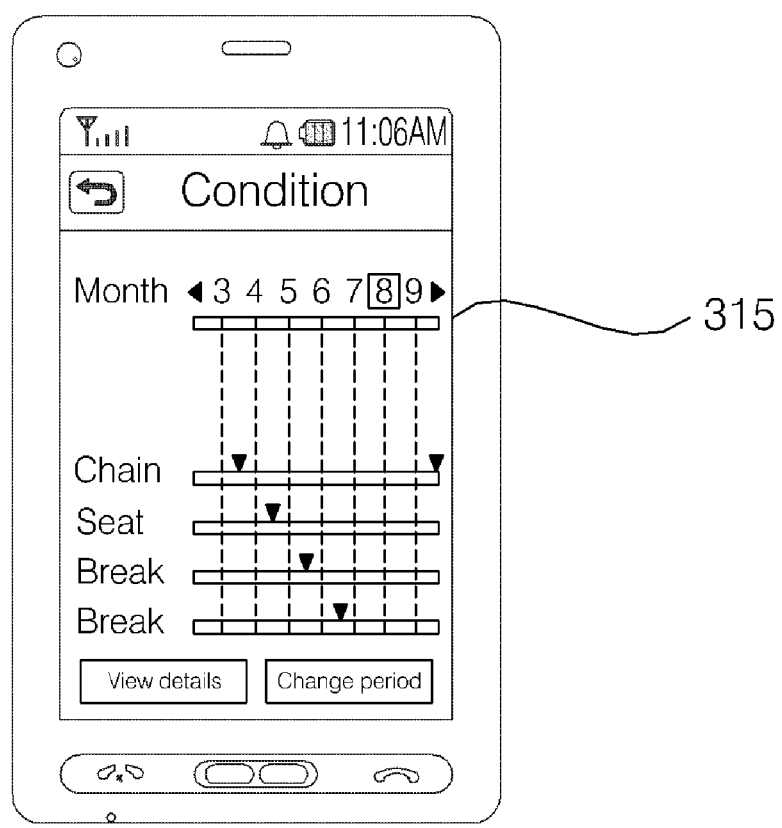

The controller 180 displays a screen 315 indicating bicycle inspection time information on the display unit 151 as shown in FIG. 6d. In this embodiment, the controller 180 displays information regarding previous and future inspection times of oil, seat, brake, and tire of the bicycle on a monthly basis. The user may determine the bicycle states and the bicycle inspection times through the screen 315 which displays the bicycle inspection time information and then may execute inspection of the bicycle accordingly.

Figure 7A:
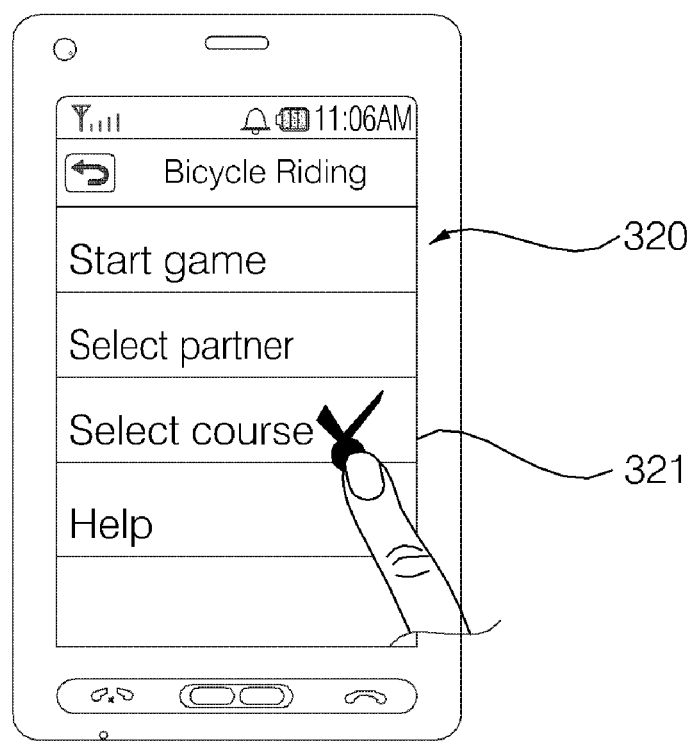
Figure 7B:
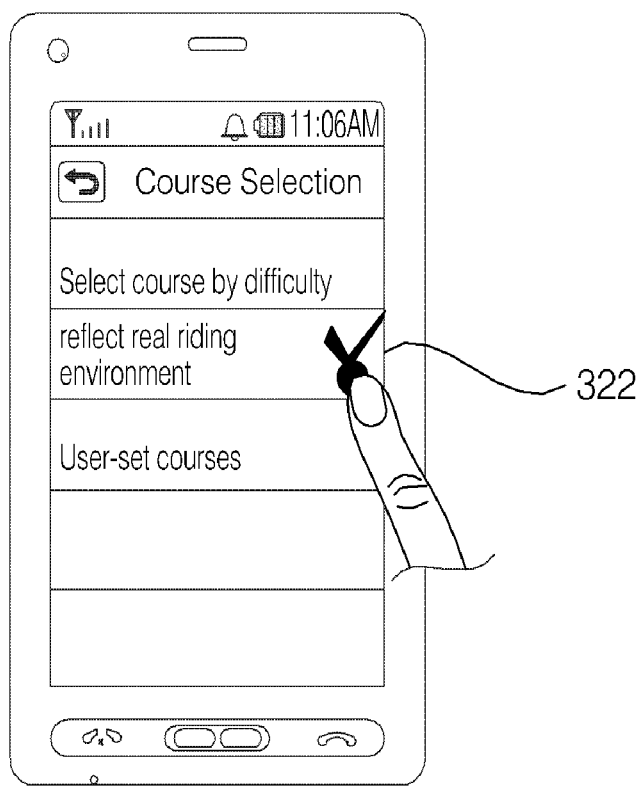

FIGS. 7a and 7b illustrate screens displayed on a mobile terminal according to a fourth embodiment of the present invention.

Specifically, FIGS. 7a and 7b illustrate screens displayed on the mobile terminal in the case where a bicycle riding course selection program which is one of a variety of bicycle riding applications is executed.

The user may execute a bicycle riding application after installing the mobile terminal 100 on the bicycle. The controller 180 displays a screen 320, including menu items that the user can select when riding the bicycle, on the display unit 151. The mobile terminal 100 of this embodiment allows the user to execute a game, to select a partner to ride with, or to select a course when riding the bicycle.

When a bicycle game is selected, the controller 180 may display a virtual reality screen corresponding to the riding course information or display another virtual bicycle user on the display unit 151. When the user has selected a partner to ride with, the controller 180 may display a list of partners that can be selected by the user on the display unit 151.

In this embodiment, the user selects an item 321 that enables selection of a bicycle riding course. The controller 180 displays a screen including a submenu, which enables the user to select a course to ride, on the display unit 151 as shown in FIG. 7b. The user may select one of riding courses classified by difficulty or may select one of riding courses in which a real riding environment is reflected. The user may also select a preset course.

In FIG. 7b, the user may input a command to select a course, in which a real riding environment is reflected, by touching a corresponding item 322. The controller 180 may display a list of courses that the user can select from among the courses in which a real riding environment is reflected in response to the command input by the user.

Figure 8A:
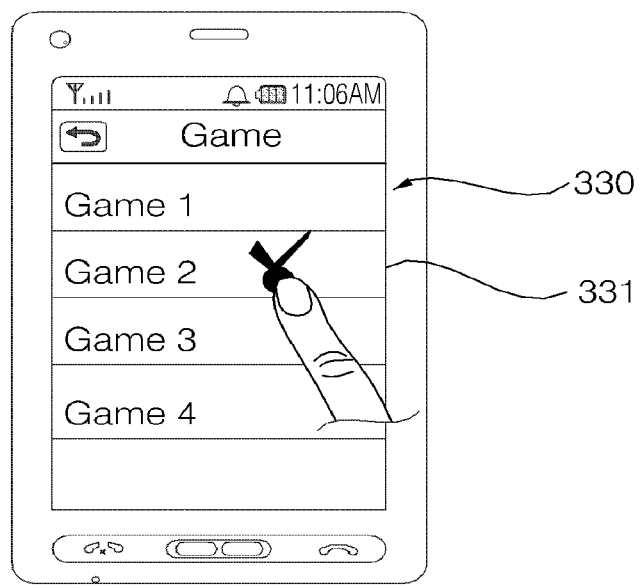
Figure 8B:
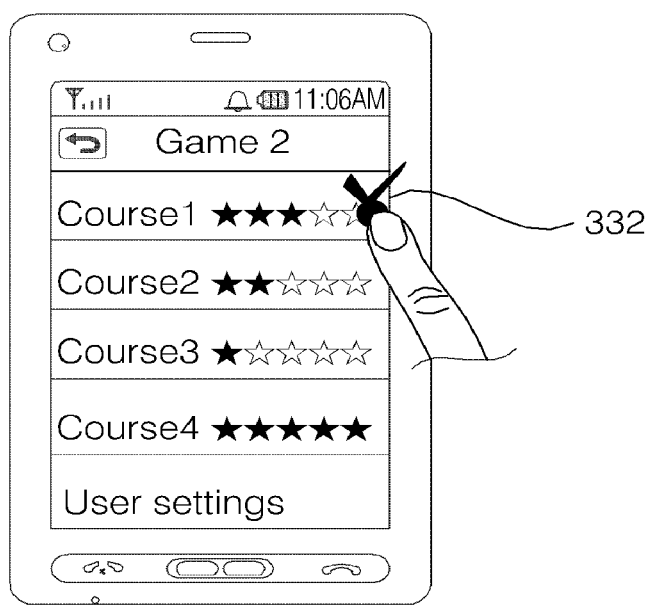
Figure 8C:
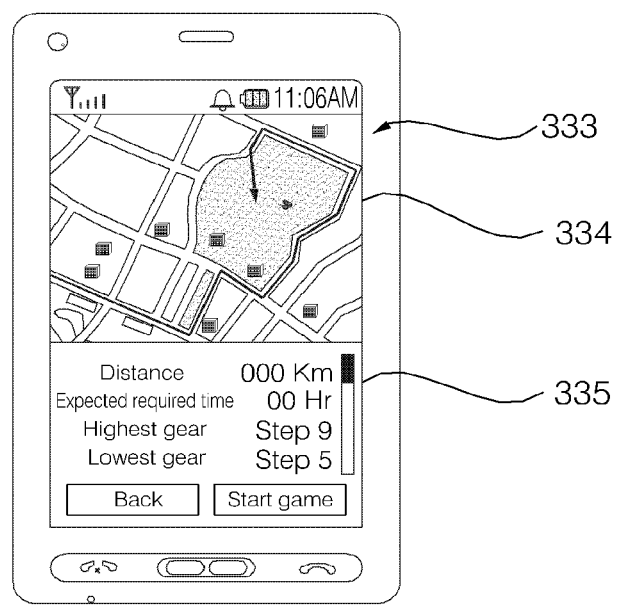

FIGS. 8a to 8c illustrate screens displayed on a mobile terminal according to a fifth embodiment of the present invention.

In this embodiment, the controller 180 displays a game program, which is one of a variety of bicycle riding applications, on the controller 180. When the user desires to increase the riding speed of the bicycle of the user through a game when riding the bicycle, the user may input a command to execute a bicycle game program to the mobile terminal. The controller 180 displays a game program screen 330 including game items, which can be selected by the user, on the display unit 151 as shown in FIG. 8a. In this embodiment, the user may input a command to select a second game to the mobile terminal 100. The user inputs the second game selection command to the mobile terminal 100 by touching a second game item 331.

The controller 180 may display riding courses included in the second game, together with information regarding the degrees of difficulty of the courses, on the display unit 151. The user may touch and select a first course item 332 among the courses displayed on the screen shown in FIG. 8b.

The controller 180 displays a screen 333 including information regarding a course corresponding to the item touched by the user on the display unit 151 as shown in FIG. 8c. The controller 180 displays a map 334 including the first course and a window 335 indicating information associated with the first course such as a riding distance and an expected time required to complete the course on the display unit 151. The user may check the first course map and the information associated with the first course through the screen shown in FIG. 8c.

Figure 9A:
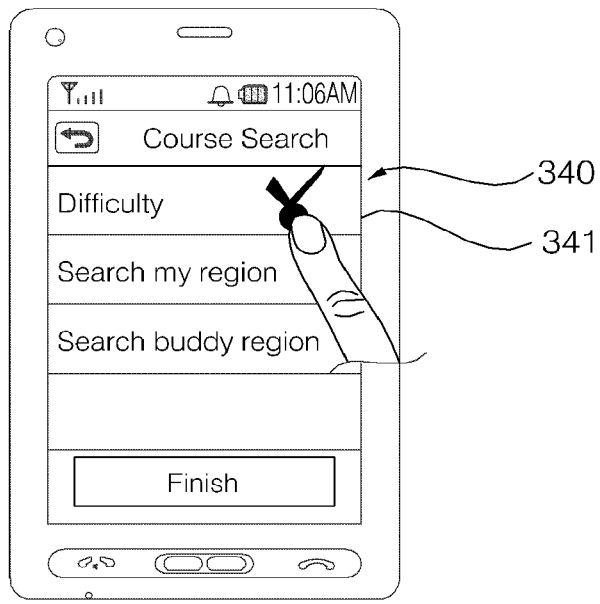
Figure 9B:
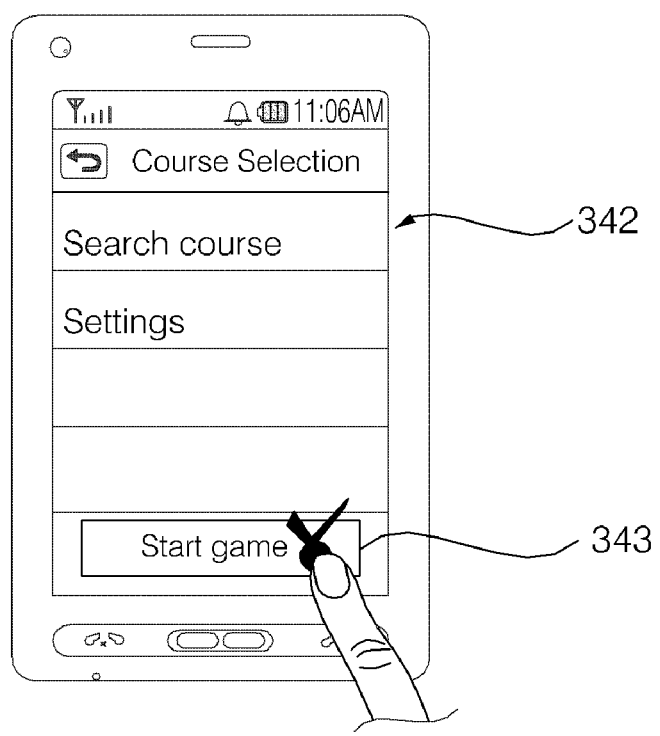
Figure 9C:
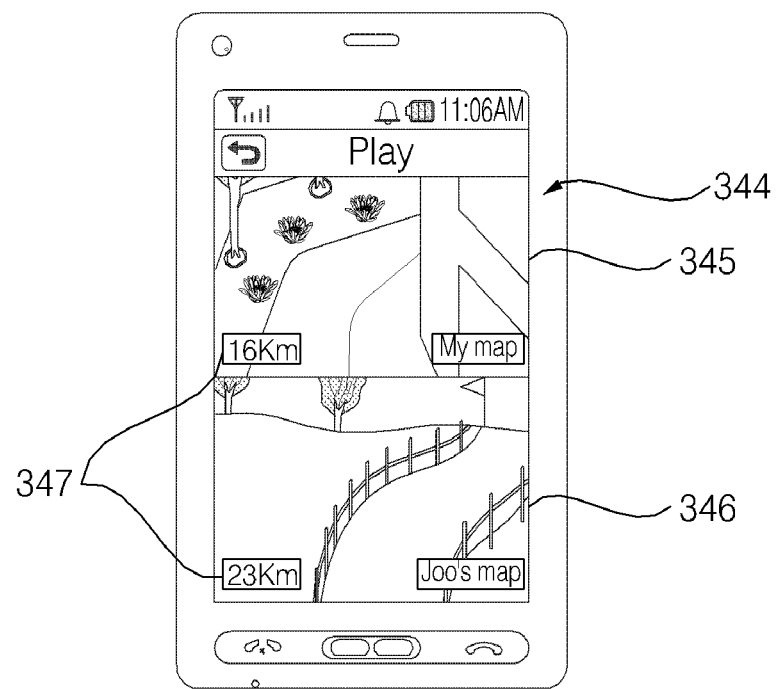

FIGS. 9a to 9c illustrate screens displayed on a mobile terminal according to a sixth embodiment of the present invention.

In this embodiment, the user may set a degree of difficulty of a desired riding course by selecting a difficulty setting item 341 among items included in a course search screen 340 shown in FIG. 9a. When the user has set the degree of difficulty of the desired riding course, the controller 180 displays a course selection screen 342 on the display unit 151 as shown in FIG. 9b. The user may input a game start command to the mobile terminal 100 by selecting a game start icon 343.

The controller 180 displays a game screen 344 on the display unit 151 as shown in FIG. 9c in response to the game start command input by the user.

An upper portion of the game screen 344 may be a screen 345 including a riding environment of the user of the mobile terminal. A lower portion of the game screen 344 may be a screen 346 including a riding environment of a different mobile terminal user registered by the user of the mobile terminal 100 or may be a riding environment of a virtual user.

Using a popup window 437, the controller 180 may display information regarding a riding speed of the user of the mobile terminal 100 and a riding speed of a different mobile terminal user registered by the user of the mobile terminal 100. The different mobile terminal user is a user who rides a bicycle on which a different mobile terminal capable of transmitting and receiving wireless signals to and from the mobile terminal 100 through the wireless communication unit 110 is installed.

Figure 10A:
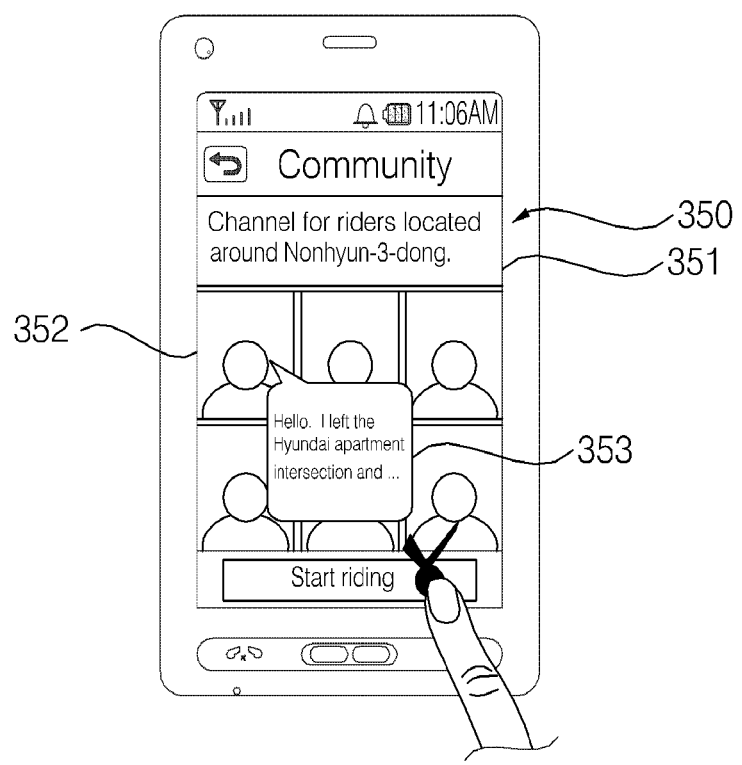
Figure 10B:
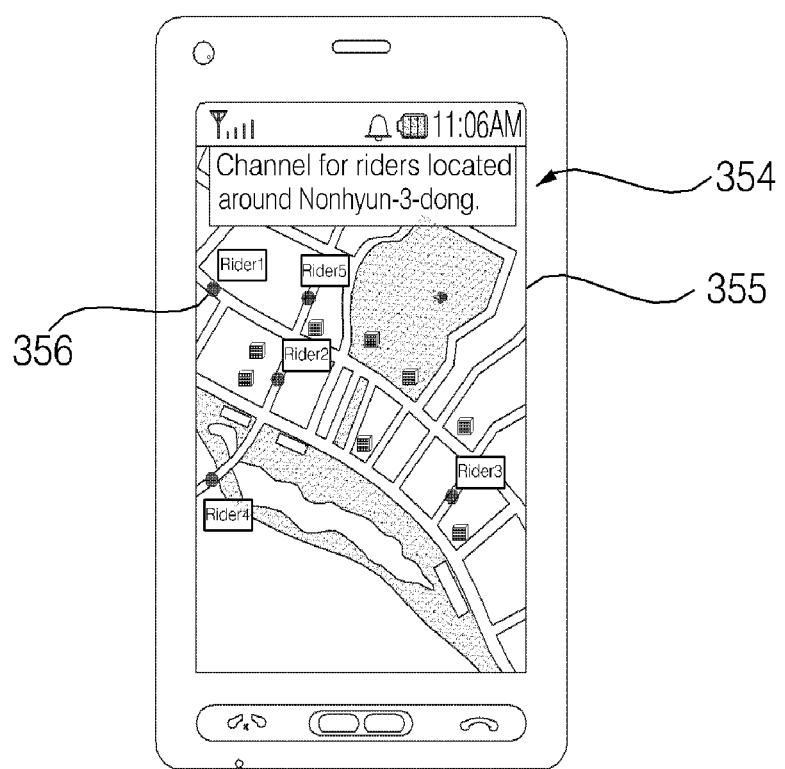
Figure 10C:
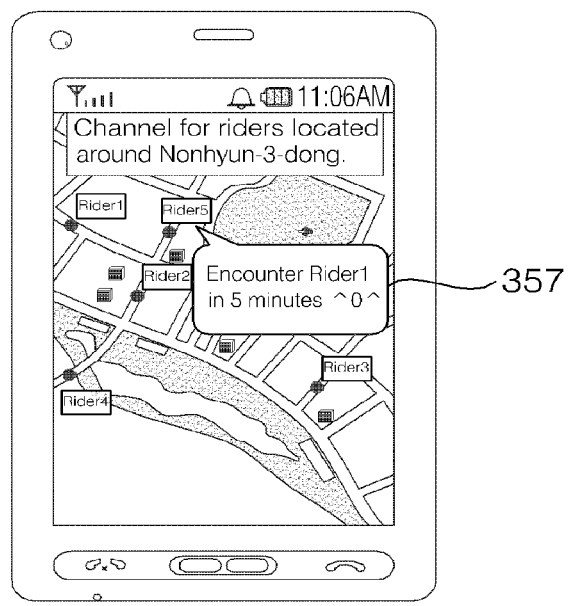

FIGS. 10a to 10c illustrate screens displayed on a mobile terminal according to a seventh embodiment of the present invention.

In this embodiment, the user may join a bicycle club and may bicycle with other mobile terminal users registered in the club. As shown in FIG. 10a, the controller 180 displays a bicycle club screen 350 on the display unit 151. In the embodiment, the bicycle club is a club of bicycle users who are located in a specific region. The controller 180 may display, on the display unit 151, a bicycle club screen 350 including a window 351 indicating information regarding the club and a window 352 including images of users registered in the club.

The controller 180 may display information such as a text message sent by one of the users of the bicycle club through a popup window. In this embodiment, the controller 180 of the mobile terminal 100 displays information sent by a user of a bicycle in which another mobile terminal is installed through a popup window 353.

As shown in FIG. 10b, when the user starts bicycling, the controller 180 displays a screen 354 containing information regarding bicycle riding of members of the bicycle club on the display unit 151. The controller 180 displays an image 356 corresponding to the positions of the members of the bicycle club on a map screen 354 containing riding course information.

The controller 180 may also display information regarding a bicycle club user on the display unit 151 through a popup window 357 as shown in FIG. 10c. In this embodiment, the controller 180 determines current position information of user 1 and position information of user 5 and displays, on the display unit 151, information indicating that user 1 and user 5 of the mobile terminal 100 will encounter each other in one minute based on the determination.

Figure 11A:
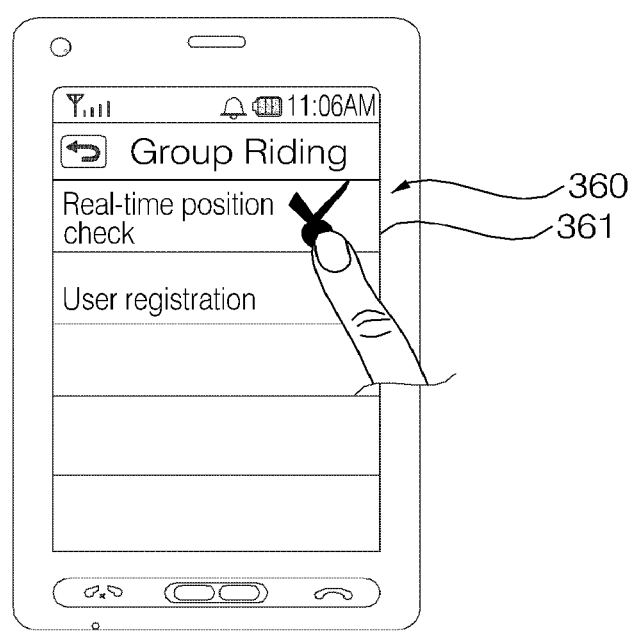
Figure 11B:
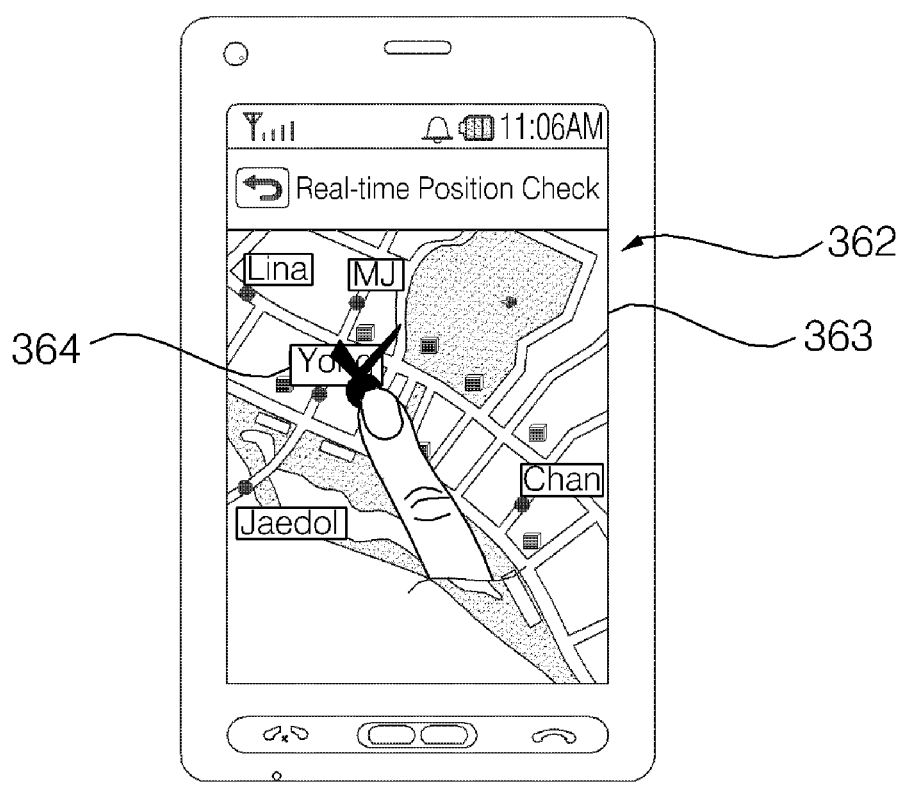
Figure 11C:
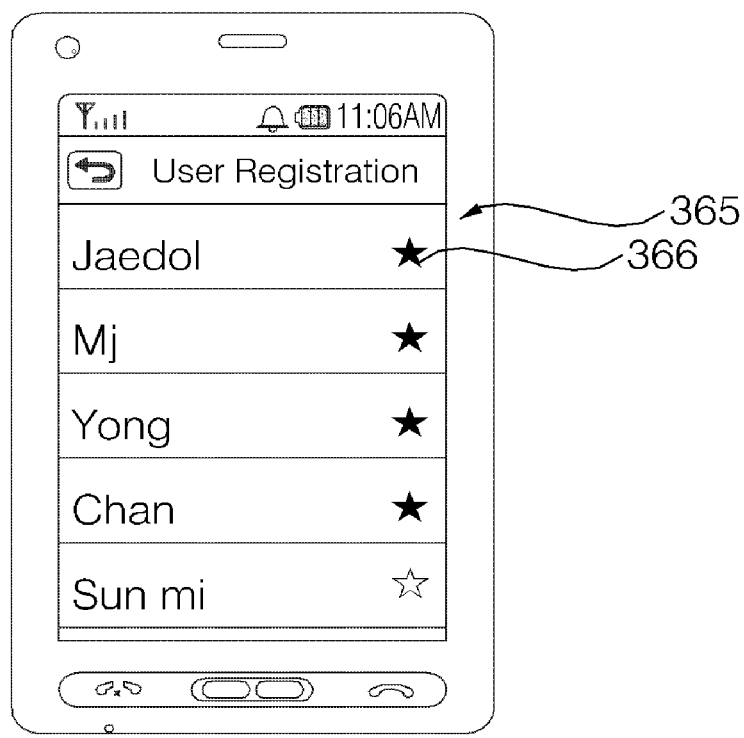

FIGS. 11a to 11c illustrate screens displayed on a mobile terminal according to an eighth embodiment of the present invention.

As shown in FIG. 11a, the controller 180 of the mobile terminal 100 may display, on the display unit 151, a screen 360 including an item that enables input of a command to check the position of another member of a bicycle club joined by the user and an item that enables input of a command to register a new member in the bicycle club.

The user may input a command to check the position of a different member to the mobile terminal 100 by touching a different member position check command input item 361 on the screen displayed on the display unit 151. As shown in FIG. 11b, the display unit 151 displays a real-time position check screen 362 on the display unit 151 in response to the different member position check command input by the user.

The real-time position check screen 362 includes a map screen 363 indicating position information of other members. The user may view a riding speed of another member by selecting an icon 364 corresponding to the member displayed on the map screen 363. The user may also execute an application for sending a message to another member or calling the member by selecting an icon 364 corresponding to the member displayed on the map screen 363.

When the user has touched an item that enables input of a user registration command on the screen 360 shown in FIG. 11a, the controller 180 displays a user registration screen 365 on the display unit 151 as shown in FIG. 11c. The controller 180 may display a list of users registered in the club and icons 366, each indicating whether or not the corresponding user is currently bicycling.

Figure 12A:
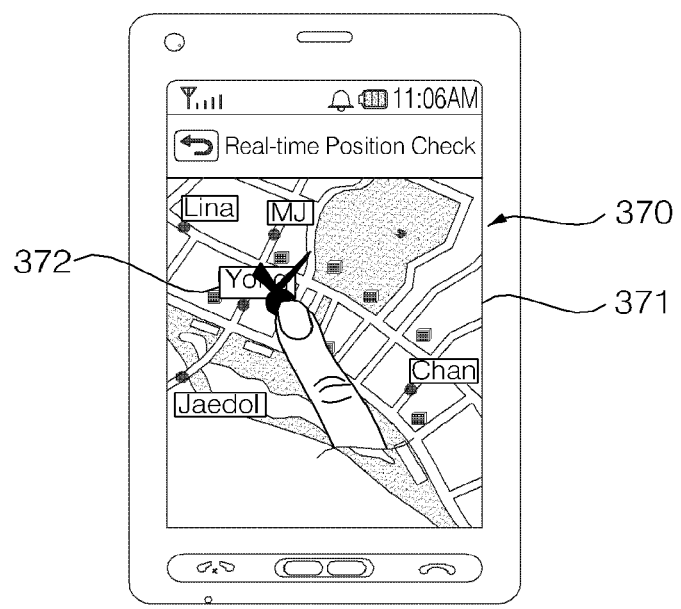
Figure 12B:
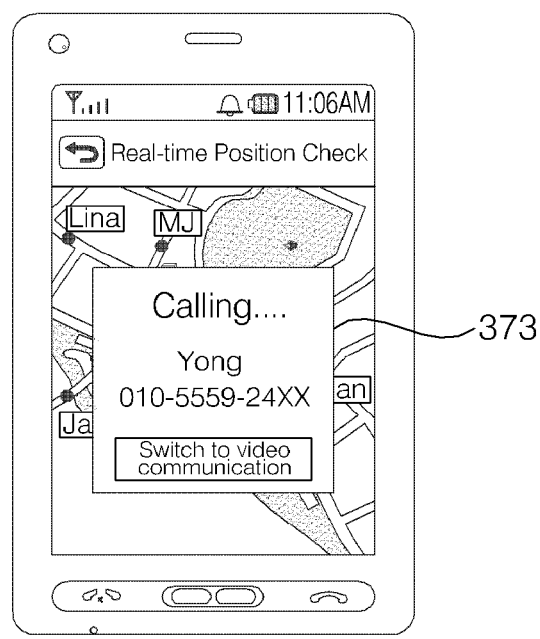
Figure 12C:
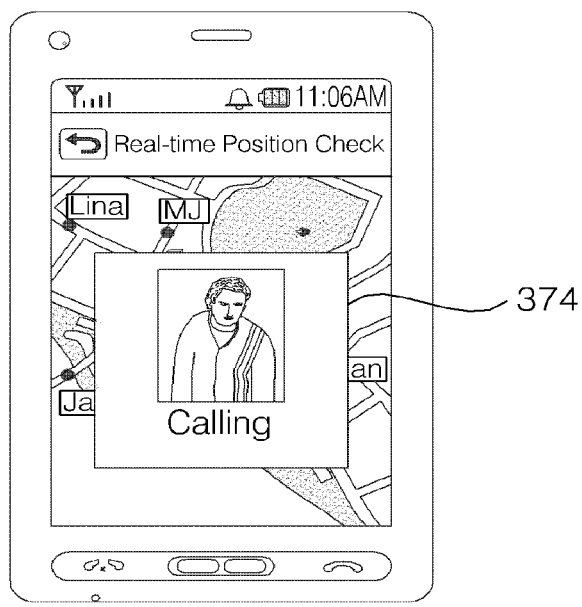

FIGS. 12a to 12c illustrate screens displayed on a mobile terminal according to a ninth embodiment of the present invention.

FIG. 12a illustrates a screen in an example where an icon 372 corresponding to a specific user from among users displayed on a map screen 371 is selected on a real-time position check screen 370. The user may input a command to call the specific user to the mobile terminal 100 by selecting an icon 372.

When the user has input the call command to the mobile terminal 100, the controller 180 executes a phone call application as shown in FIG. 12b. When the phone call application is executed, the controller 180 displays a popup window 373 indicating call status on the display unit 151.

The controller 180 may display a video communication screen 374 on the display unit 151 as shown in FIG. 12c when the counterpart has answered the call.

Figure 13A:
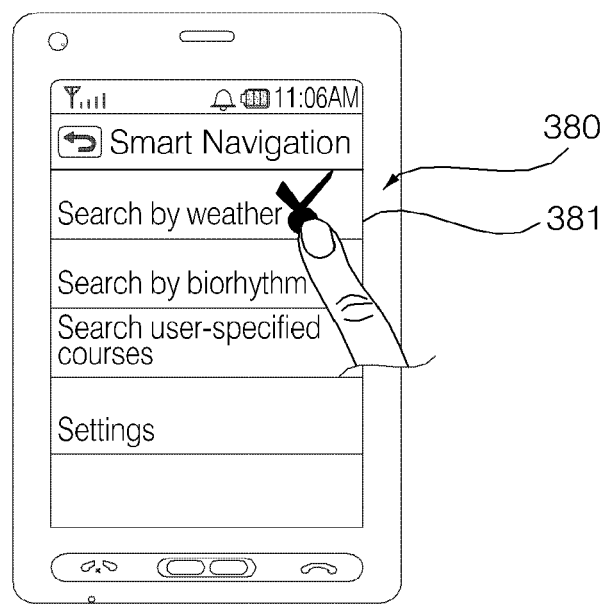
Figure 13B:
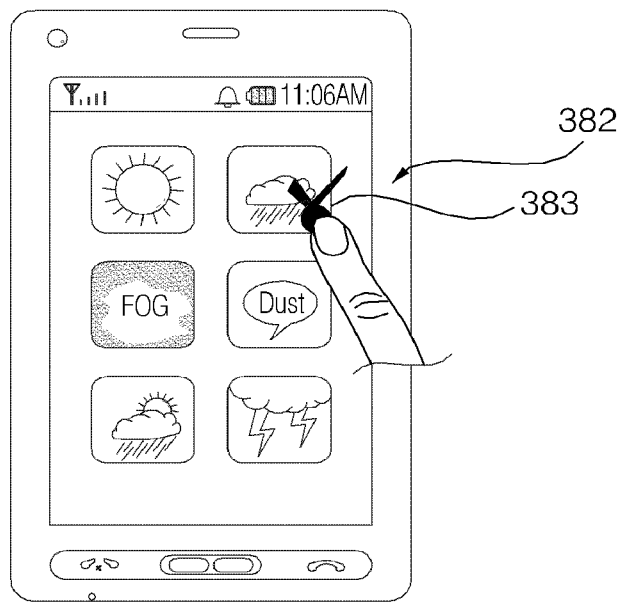
Figure 13C:
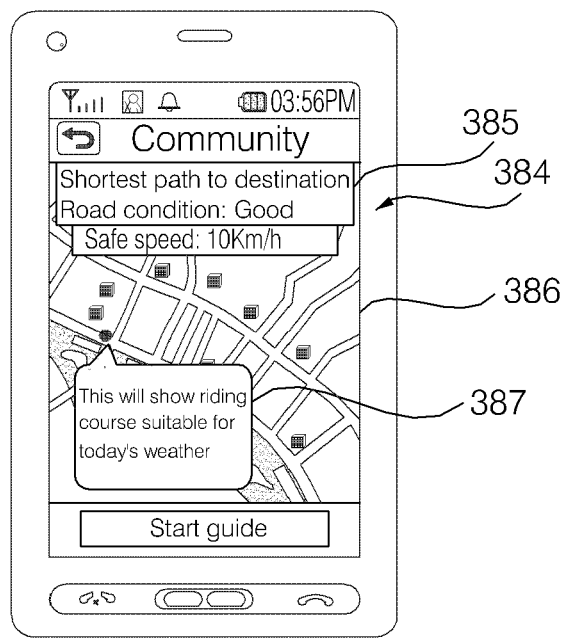

FIGS. 13a to 13c illustrate screens displayed on a mobile terminal according to a tenth embodiment of the present invention.

In this embodiment, the controller 180 may classify various riding course information into at least one category and store the same in the mobile terminal 100. The controller 180 displays a course information search screen 380 on the display unit 151 to allow the user to select course information stored in a desired category as shown in FIG. 13a.

The user may select an item 381 that enables search of recommended course information on the basis of weather from among items displayed on the screen shown in FIG. 13a. When the user has touched and selected the weather-based course search item 381, the controller 180 displays a screen including icons indicating selectable weather conditions on the display unit 151 as shown in FIG. 13b.

The user may touch and select an icon 383 corresponding to rainy weather from among the icons displayed on the screen shown in FIG. 13b. The controller 180 may search for recommendable course information corresponding to the icon 383 touched by the user and display the found course information on the display unit 151.

FIG. 13c shows a screen 384 including the course information found by the user which is displayed on the display unit 151. As shown, the controller 180 displays a recommended course information display window 385, a recommended speed display window 386, and a guide/notification window 387, together with a map corresponding to the found course information, on the display unit 151.

Figure 14A:
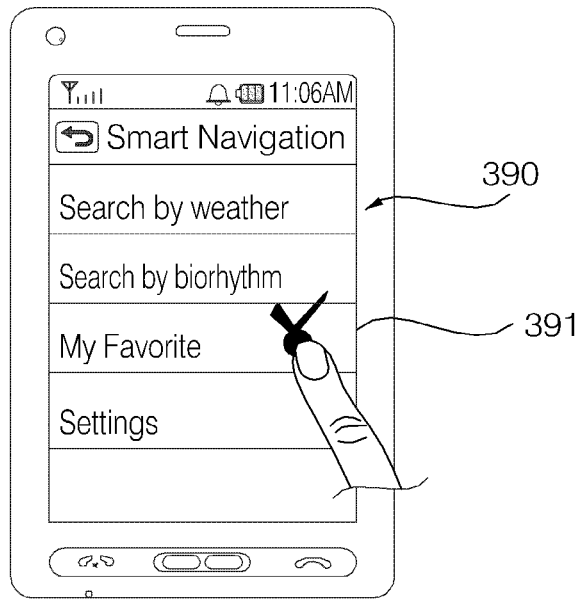
Figure 14B:
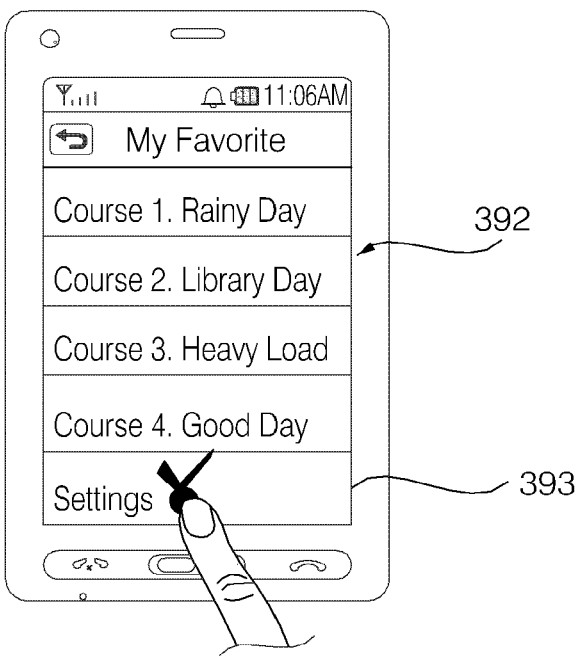
Figure 14C:
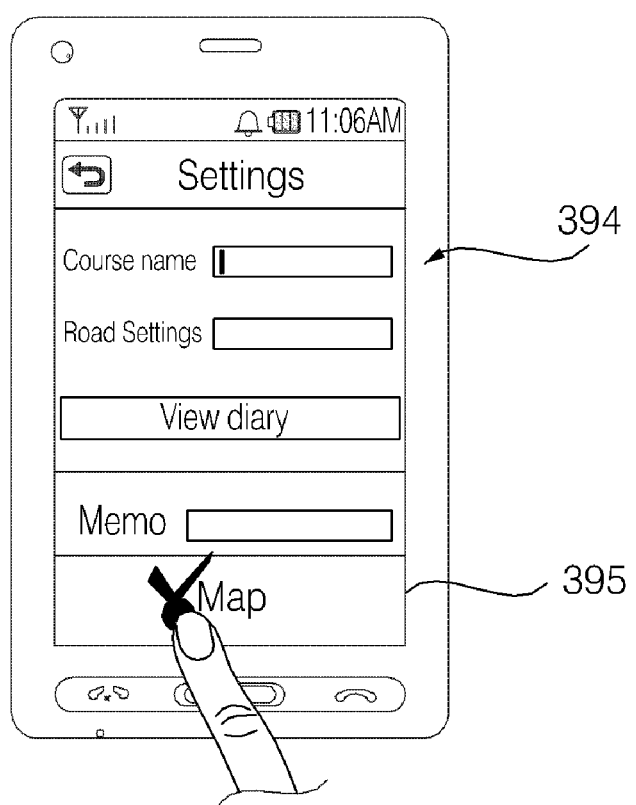

FIGS. 14a to 14c illustrate screens displayed on a mobile terminal according to an eleventh embodiment of the present invention.

As shown in FIG. 14a, the user may input, to the mobile terminal 100, a command to select course information from among a plurality of course information set by the user. When the user has touched a "My Favorite" item 391, the controller 180 of the mobile terminal 100 displays a screen 392 including course items set by the user on the display unit 151 as shown in FIG. 14b. The user may set and store new course information by touching a screen setting icon 393 shown in FIG. 14b.

FIG. 14c illustrates a screen that the controller 180 displays on the display unit 151 when the user has selected the setting icon 393. As shown, the controller 180 displays, on the display unit 151, a screen including a setting window 394 that enables input of a name, route, or the like of a course that the user desires to set and a map call icon 395 that enables calling of a map so that the user can set course information through the map.

The user may input a name or the like of a course, which the user desires to store, through the setting window 394 and may store new course information using the map called through the map call icon 395.

FIGS. 15a to 15d illustrate screens displayed on a mobile terminal according to a twelfth embodiment of the present invention.

In this embodiment, a training program, which is one of a variety of bicycle riding applications, is executed on the mobile terminal 100. When the user inputs a command to execute the training program to the mobile terminal 100, the controller 180 displays a training program screen 410 on the display unit 151.

The user may touch and select an item 411, which enables input of a command to update a guide program, from among items displayed on the training program screen 410. The controller 180 may update a program, which is recommendable to the user, through the Internet when the user has input the program update command to the mobile terminal 100.

Figure 15A:
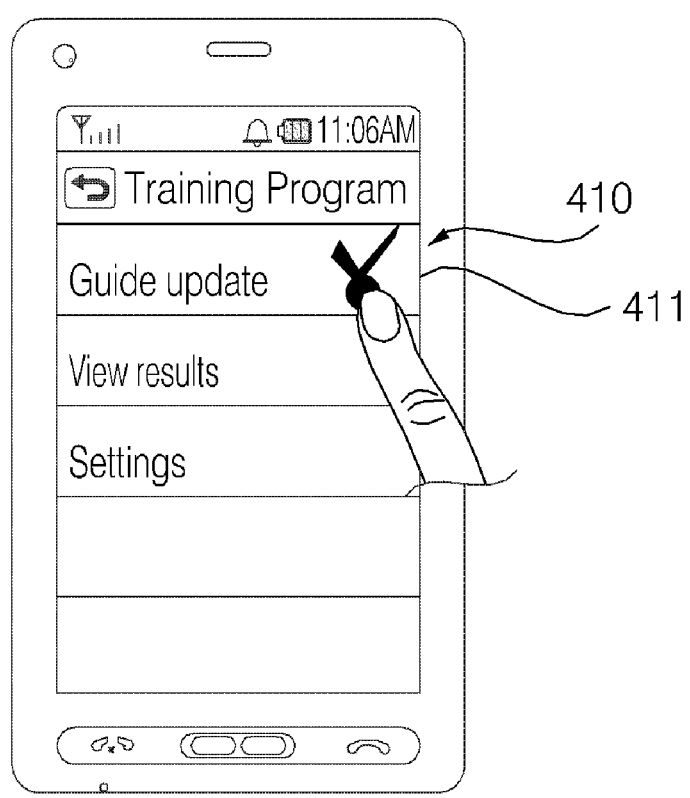
Figure 15B:
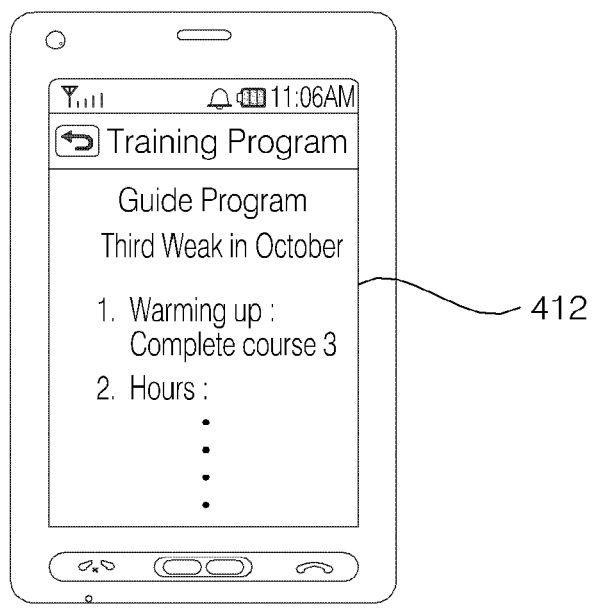

As shown in FIG. 15b, the controller 180 may display the updated guide program screen 412 on the display unit 151. The user may ride the bicycle with reference to the updated guide program.

Figure 15C:
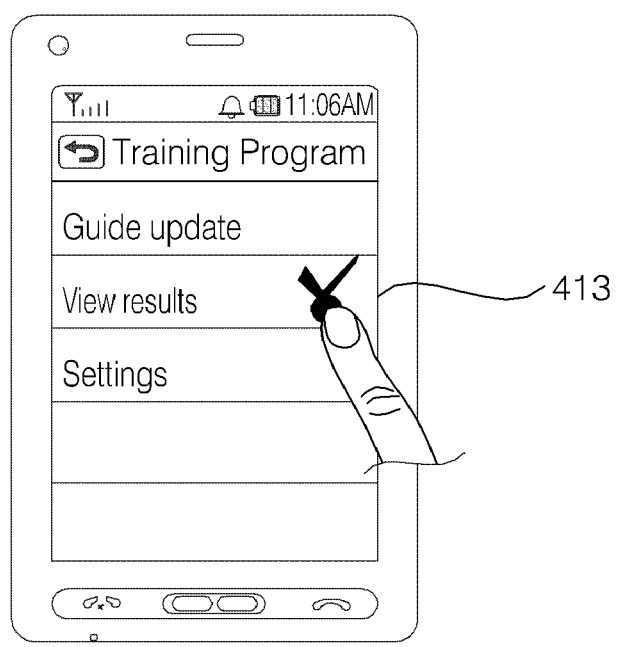

The user may touch and select an item 413, which enables input of a command to display training information of the user, from among the items displayed on the training program screen 410. The controller 180 may display the training information of the user of the mobile terminal 100 on the display unit 151 in response to the training information display command input by the user as shown in FIG. 15c.

Figure 15D:
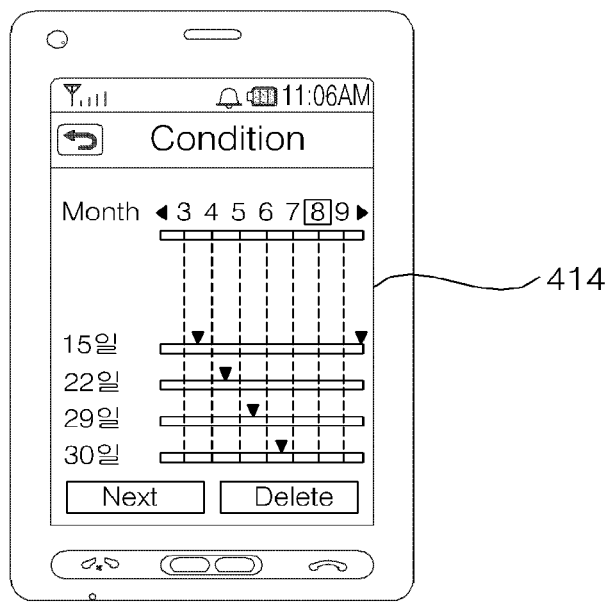

FIG. 15d illustrates a training information screen 414 that the controller 180 displays on the display unit 151. As shown, the user may check training records for the past several months of the user through the training information screen 414.

Figure 16A:
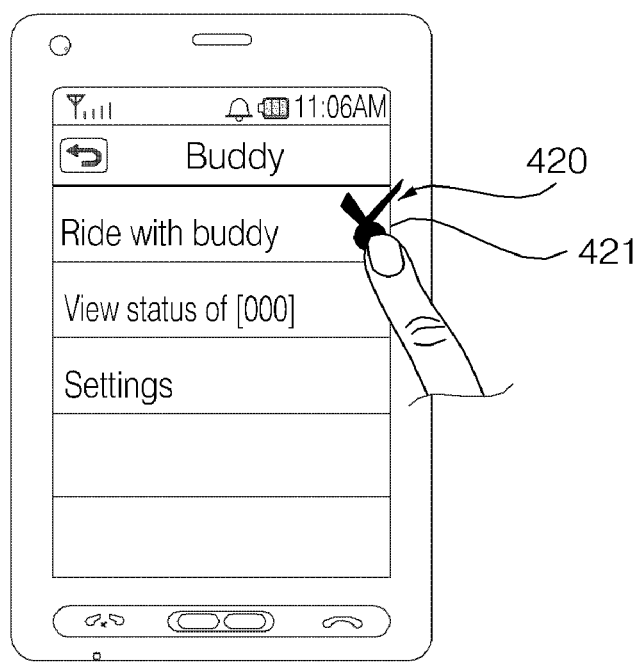
Figure 16B:
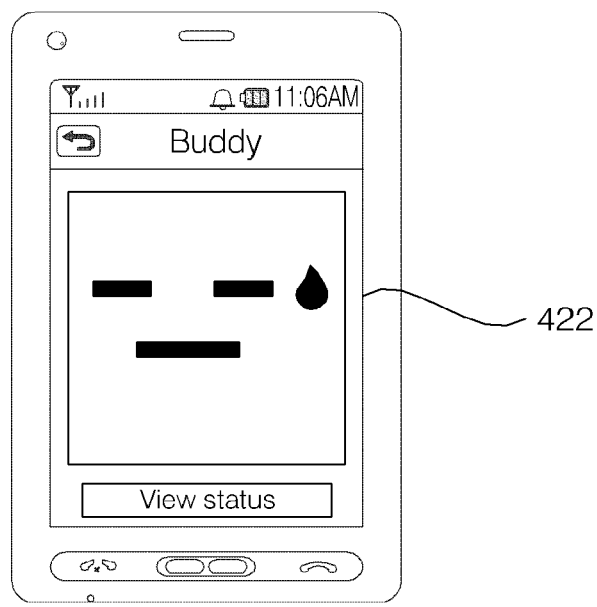

FIGS. 16a and 16b illustrate screens displayed on a mobile terminal according to a thirteenth embodiment of the present invention. In this embodiment, the mobile terminal 100 displays a virtual counterpart on the display unit 151. The virtual counterpart may be changed according to riding course, riding distance, riding speed, or condition of the user of the mobile terminal 100, weather, or the like. The controller 180 may display a virtual counterpart corresponding to a command input by the user on the display unit 151. The controller 180 may display, on the display unit 151, virtual counterpart corresponding to a riding course, riding distance, riding speed, or condition of the user of the mobile terminal 100, weather, or the like.

As shown in FIG. 16a, the controller 180 displays a screen 420 which enables input of a command to ride with a virtual counterpart on the display unit 151. The user may touch an item 421 corresponding to a command to ride with the counterpart.

In response to touching of the item 421 by the user, the controller 180 may display an image 422 corresponding to an avatar of the virtual counterpart on the display unit 151 as shown in FIG. 16b. The user may change the virtual counterpart.

The virtual user of FIG. 16b may be the same as that displayed on the bicycle riding guide screen of FIG. 5d. The virtual user's face may correspond to the current riding speed, riding time, or riding distance of the bicycle. The virtual user's face may also correspond to a result of comparison of the current riding speed, riding time, riding distance, or the like of the bicycle with an appropriate riding speed, riding time, riding distance, or the like.

In an example, the virtual user's face may be as shown in FIG. 16b when the current riding speed of the bicycle is less than the appropriate riding speed. The user may refer to the virtual user's face displayed on the screen shown in FIG. 16b when riding the bicycle. The user may increase the riding speed of the bicycle of the user upon viewing the virtual user's face as shown in FIG. 16b. The controller 180 changes the virtual user's face displayed on the screen shown in FIG. 16b when the riding speed of the bicycle of the user has reached the appropriate riding speed.

Figure 17A:
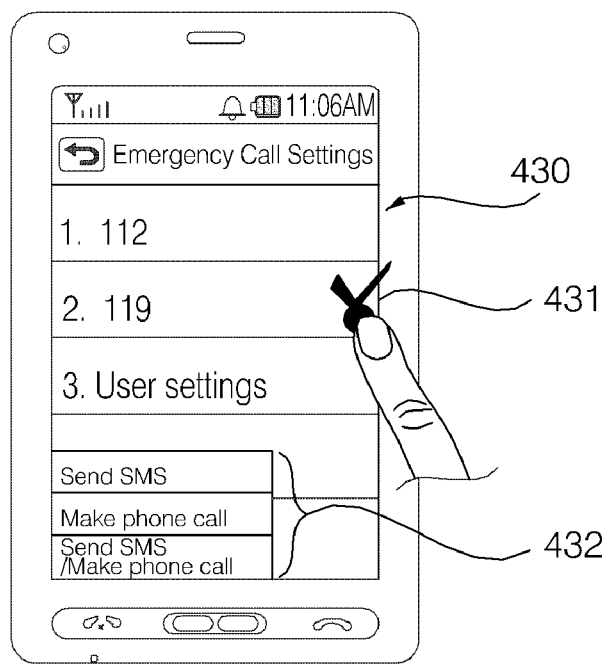
Figure 17B:
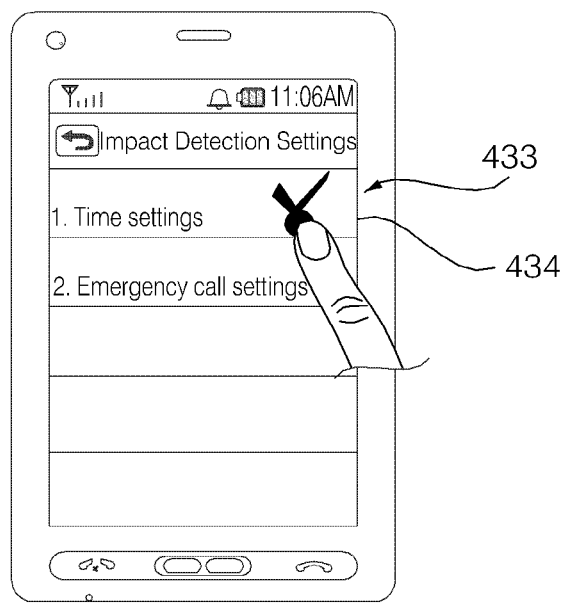
Figure 17C:
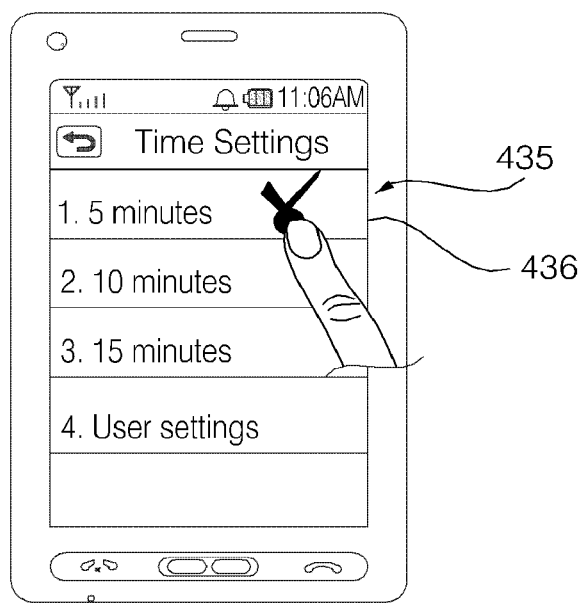

FIGS. 17a to 17c illustrate screens displayed on a mobile terminal according to a fourteenth embodiment of the present invention.

In this embodiment, the mobile terminal 100 may detect a level of impact applied to the bicycle on which the mobile terminal is installed and may output a rescue request signal when the level of impact is equal to or greater than a reference level. The rescue request signal may be a signal for sending a rescue request text message or a signal for making a rescue request phone call. The user may set rescue request preferences of the mobile terminal through the screens shown in FIGS. 17a to 17c As shown in FIG. 17a, the user may set a destination to which the rescue request signal is to be output. The controller 180 may, on the display unit 151, display a screen 430 including a list of rescue request recipients that are selectable by the user. The controller 180 may also display a popup window 432, which enables selection of a type of rescue request signal to be output, on the display unit 151.

The user may select an item 431 corresponding to a recipient to which the rescue request signal will be output on the screen shown in FIG. 17a. In this embodiment, the user sets preferences of the mobile terminal 100 so as to output a rescue request signal to 119.

FIG. 17b illustrates an impact detection setting screen 433 that the controller 180 displays on the display unit 151. The user may set the time when a rescue request is output after selecting the recipient to which the rescue request signal will be output. The user may set the time when a rescue request is output by touching an item 434 corresponding to the time setting.

In this embodiment, upon detecting that a level of impact equal to or greater than the reference level has been applied to the bicycle, the controller 180 detects whether or not the bicycle has moved for a predetermined time after the impact has been applied. When movement of the bicycle is not detected for the predetermined time after the impact is applied, the controller 180 outputs a rescue request signal to a rescue request recipient set by the user.

The controller 180 may display a time setting screen 435 on the display unit 151 as shown in FIG. 17c. The user may set a time that will be taken until a rescue request signal is output after impact is detected through the time setting screen 435. In this embodiment, the user selects an item 436 corresponding to 5 minutes. The controller 180 outputs a rescue request signal as set on the screen of FIG. 17a when movement of the bicycle is not detected for 5 minutes after it is detected that a level of impact equal to or greater than the reference level has been applied to the bicycle on which the mobile terminal 100 is installed.

Figure 18A:
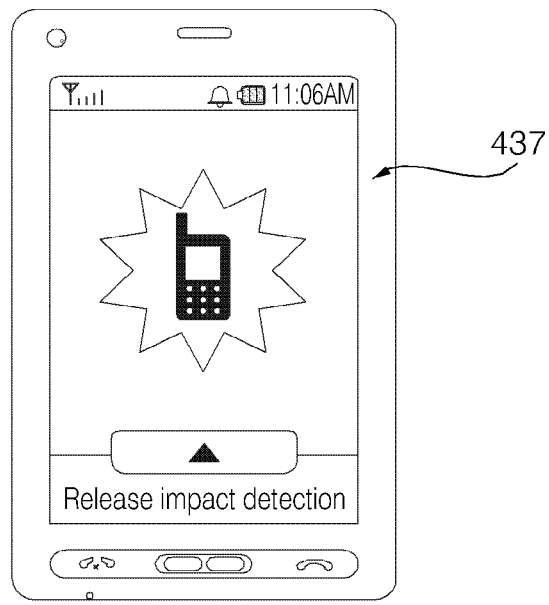
Figure 18B:
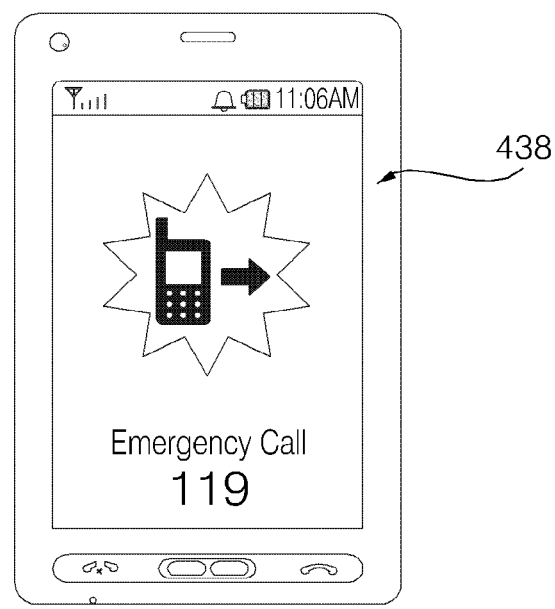

FIGS. 18a and 18b illustrate screens displayed on a mobile terminal according to a fifteenth embodiment of the present invention.

FIG. 18a illustrates a screen 437 displayed on the display unit 151 of the mobile terminal 100 in which an impact detection function has been set. The user may determine that the impact detection function has been set in the mobile terminal 100 through the screen 437 displayed on the display unit 151. The user may release the impact detection function set in the mobile terminal 100 by touching an impact detection release region in the screen displayed on the display unit 151.

FIG. 18b illustrates a rescue request signal transmission screen 438 which the controller 180 displays on the display unit 151 when a rescue request signal is output from the mobile terminal 100 in which the impact detection function has been set. The user can confirm that a rescue request signal has been transmitted from the mobile terminal 100 through the rescue request signal transmission screen 438 displayed on the display unit 151.

The controller 180 may output a rescue request sound or voice through a speaker when a rescue request signal is transmitted from the mobile terminal 100.

The controller 180 may also detect the amount of remaining power of the mobile terminal in the case where a rescue request function has been set in the mobile terminal 100. The controller 180 may determine whether or not the amount of remaining power of the mobile terminal is sufficient to detect impact and to output a rescue request signal and may deactivate functions other than the impact detection and rescue request signal output functions upon determining that the amount of remaining power of the mobile terminal is insufficient to detect impact and to output a rescue request signal. The controller 180 may also output a warning sound or voice upon determining that the amount of remaining power of the mobile terminal is less than a reference level.

Figure 19A:
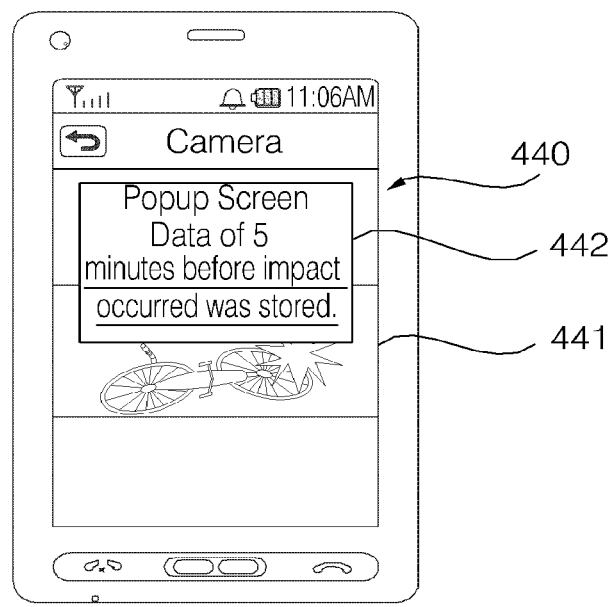
Figure 19B:
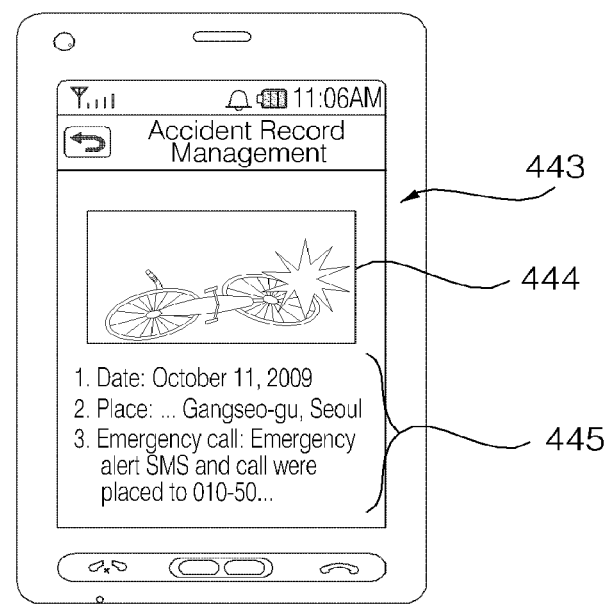

FIGS. 19a and 19b illustrate screens displayed on a mobile terminal according to a sixteenth embodiment of the present invention.

In this embodiment, the mobile terminal 100 may capture an external image when impact has occurred and may manage the captured image as an accident record. When a bicycle accident has occurred, the user may capture a surrounding environment using the mobile terminal 100. FIG. 19a illustrates a screen 440 displayed on the display unit 151 when the user has captured the accident location. As shown, a photograph 441 that the user has taken through a camera installed on the mobile terminal 100 may be stored as an accident record in the mobile terminal 100.

The controller 180 may identify the photograph, which the user has taken using the camera after a level of impact equal to or greater than the reference level is detected, as an accident-related photograph and may automatically store the same as accident-related data. The controller 180 may display a popup window 442 indicating that the accident-related data has been automatically stored on the display unit 151.

FIG. 19*b* illustrates an example in which the accident record stored in the mobile terminal 100 is displayed on the display unit 151. The controller 180 displays an accident record management screen 443 on the display unit 151 when the accident record stored in the mobile terminal 100 has been called.

The accident record management screen 443 includes an accident-related photograph 444 taken by the user and text 445 corresponding to the accident-related data. The accident-related photograph 444 displayed in this embodiment is a photograph that the user has manually taken using the mobile terminal 100 after an accident has occurred. In another example, the mobile terminal 100 may automatically capture a surrounding situation when a level of impact equal to or greater than a reference level has been detected and may store the captured photograph as an accident record.

In another example, the mobile terminal may capture the surroundings at regular intervals while the bicycle is traveling or while the bicycle riding application is running. The mobile terminal may temporarily store a still image (i.e., photograph) or a moving image obtained by filming the surroundings. The mobile terminal may delete the temporarily stored still or moving image when impact to the bicycle on which the mobile terminal is installed is not detected within a predetermined time from when the still or moving image obtained by filming the surroundings is temporarily stored.

When a level of impact equal to or greater than the reference level applied to the bicycle on which the mobile terminal is installed is detected within the predetermined time from when the still or moving image obtained by filming the surroundings is temporarily stored, the mobile terminal may store the temporarily stored still or moving image as information associated with the accident record. The mobile terminal may output the rescue request signal including the stored information associated with the accident record.

The user may check accident-related details at a later time by viewing the information associated with the accident record stored in the mobile terminal. The information associated with the accident record may include information of the bicycle such as riding speed, riding time, or position of the bicycle when the still or moving image was captured.

Figure 20A:
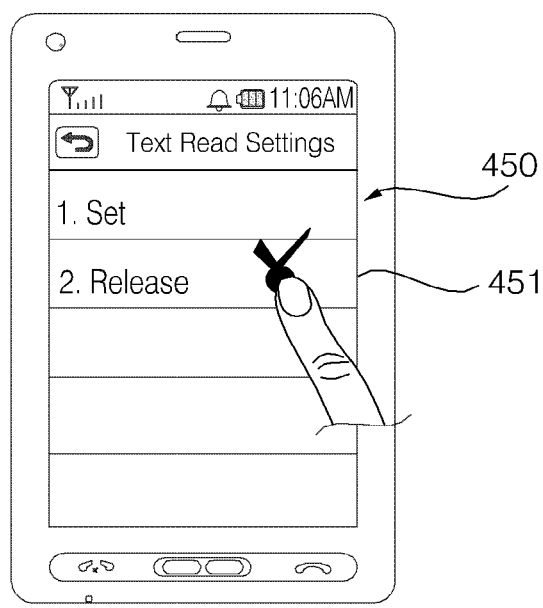
Figure 20B:
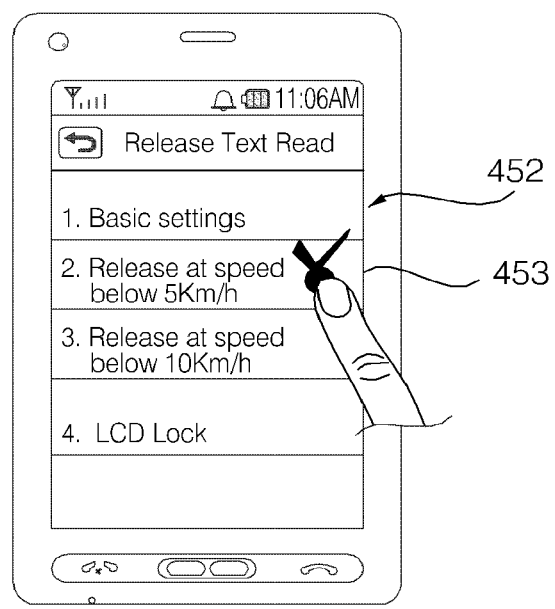

FIGS. 20*a* and 20*b* illustrate screens displayed on a mobile terminal according to a seventeenth embodiment of the present invention.

In this embodiment, the user may set an automatic text read function in the mobile terminal 100. The automatic text read function may be performed when the bicycle on which the mobile terminal 100 is installed travels at a predetermined speed or higher. That is, the controller 180 may detect the riding speed of the bicycle on which the mobile terminal 100 is installed and may perform the automatic text read function when the riding speed is equal to or greater than a reference level.

The automatic text read function is a function to automatically read a text message or an email received by the mobile terminal 100. The controller 180 may display a screen 450 which enables setting of the automatic text read function on the display unit 151 as shown in FIG. 20*a*. The user may release the automatic text read function set in the mobile terminal by touching an item 451 corresponding a command to release the automatic text read function.

FIG. 20*b* illustrates a text read release screen 452 that the controller 180 displays on the display unit 151 when the user has touched the automatic text read function release item 451. On the text read release screen 452, the user may set the automatic text read function to be released when the speed of the bicycle is reduced to 5 Km/h or less. When an item 453 corresponding to a command to release the text read function at a speed of 5 Km/h or less has been touched, the controller 180 sets the automatic text read function to be released when the speed of the bicycle is equal to or less than 5 Km/h.

Figure 21:
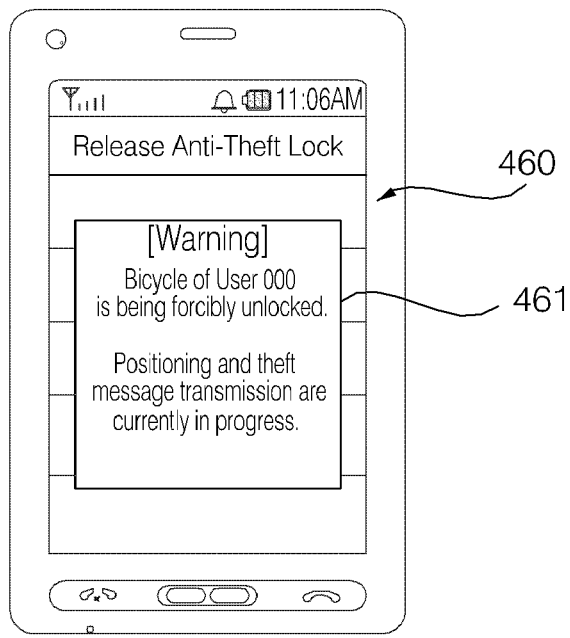

FIG. 21 illustrates a screen displayed on a mobile terminal according to an eighteenth embodiment of the present invention.

An anti-theft lock function is set in the mobile terminal 100 of this embodiment. As shown in FIG. 21, when the mobile terminal in which the anti-theft lock function has been set is unlocked, the controller 180 displays an anti-theft lock unlock screen 460 on the display unit 151.

The controller 180 may determine the current position of the bicycle on which the mobile terminal 100 is installed and output a theft message including the position information of the bicycle. The controller 180 may display information indicating that a theft message including the position information of the bicycle has been output through a popup window 461.

The controller 180 may send a theft message including the position information of the bicycle through a text (or SMS) message. The controller 180 may also attempt to perform video communication with the outside and send an image obtained by capturing a theft situation of the bicycle to the user or the like.

Figure 22:
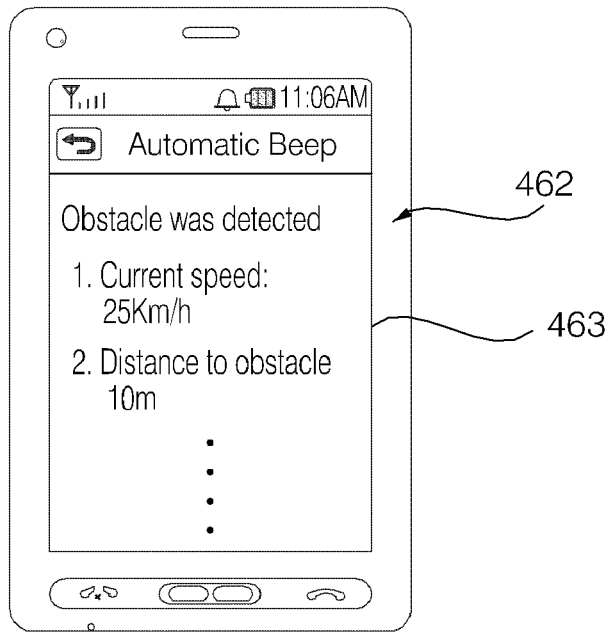

FIG. 22 illustrates a screen displayed on a mobile terminal according to a nineteenth embodiment of the present invention.

In this embodiment, the mobile terminal 100 may detect a distance to an object and output a warning sound or voice upon determining that the distance is less than a reference value. The controller 180 of the mobile terminal 100 may sense a neighboring object of the bicycle on which the mobile terminal 100 is installed and detect a distance between the sensed neighboring object and the bicycle.

The controller 180 outputs a warning sound such as beep upon determining that the distance between the neighboring object and the bicycle is less than a distance within which collision is possible. The controller 180 may also display an automatic warning screen 462 on the display unit 151. The automatic warning screen 462 may display text 463 corresponding to information such as the sensed distance to the object and the current speed of the bicycle as shown in FIG. 22.

FIGS. 23*a* to 23*d* illustrate screens displayed on a mobile terminal according to a 20th embodiment of the present invention.

Figure 23A:
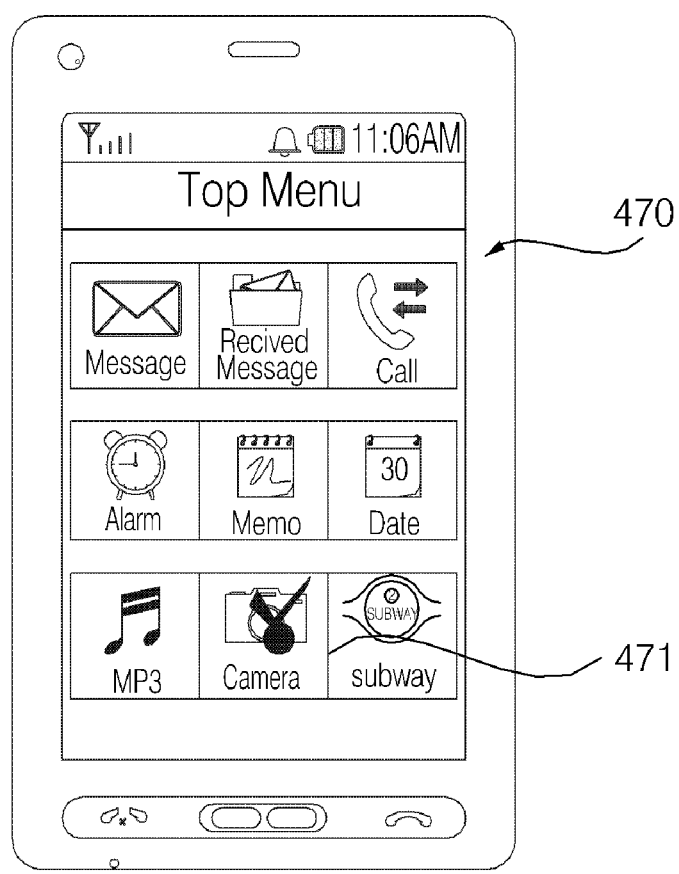

In this embodiment, the user may capture a surrounding situation through a camera and may upload the captured image to an online club site or the like. FIG. 23*a* illustrates a top menu screen 470 displayed on the display unit 151 of the mobile terminal 100. The user may touch an item 471 corresponding to the camera on the top menu screen 470. Upon detecting that the item 471 corresponding to the camera has been touched, the controller 180 determines that an image capture shooting command has been input to the mobile terminal 100.

Figure 23B:
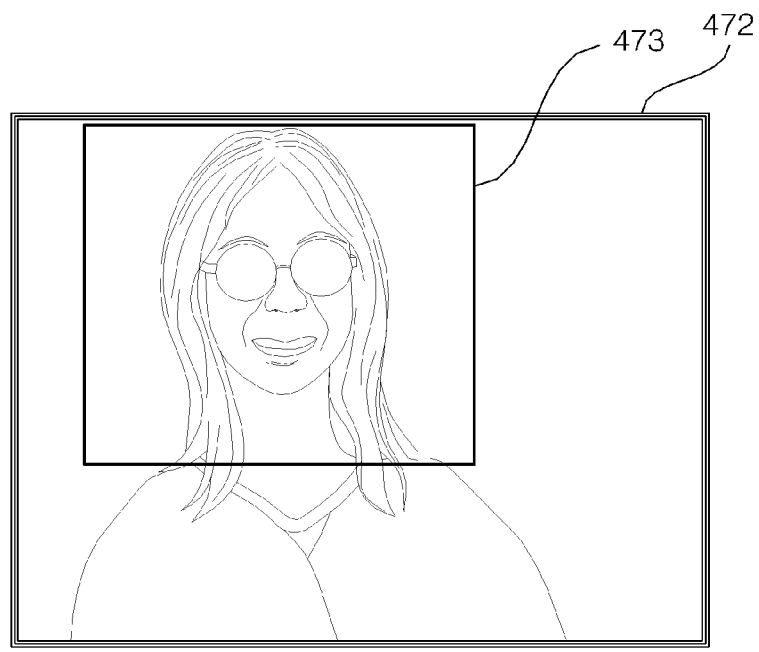
Figure 23C:
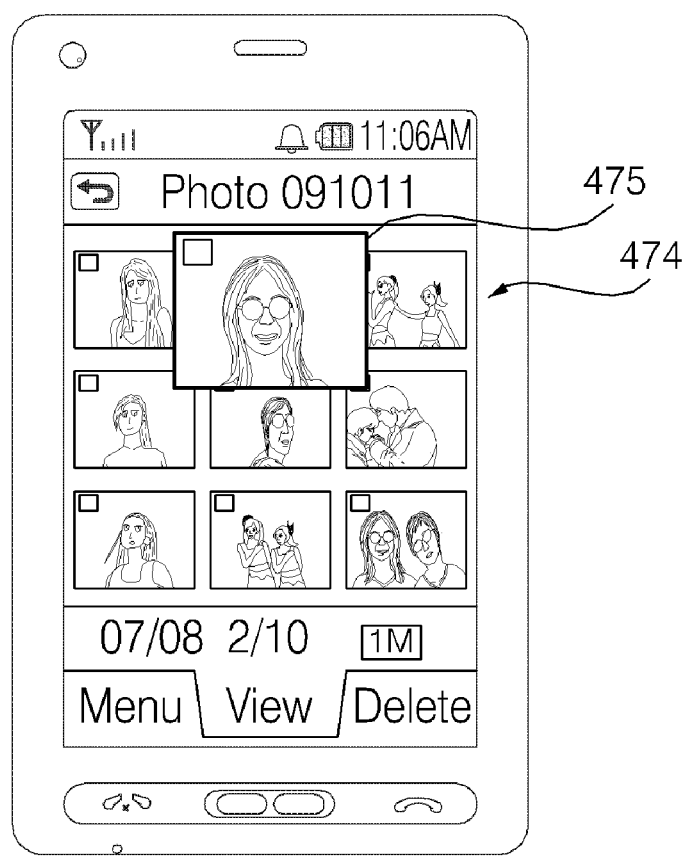

FIG. 23b illustrates a screen that enables the user to capture an image using the mobile terminal 100. As shown, the user may select and capture a specific region 473 within a region 472 that can be captured using the mobile terminal 100. A photograph selected and taken by the user may be displayed as a thumbnail screen 474 on the display unit 151 as shown in FIG. 23c. The user may touch and select a thumbnail 475 corresponding to a photograph which the user desires to upload from among thumbnails in the thumbnail screen 474 displayed on the display unit 151.

Figure 23D:
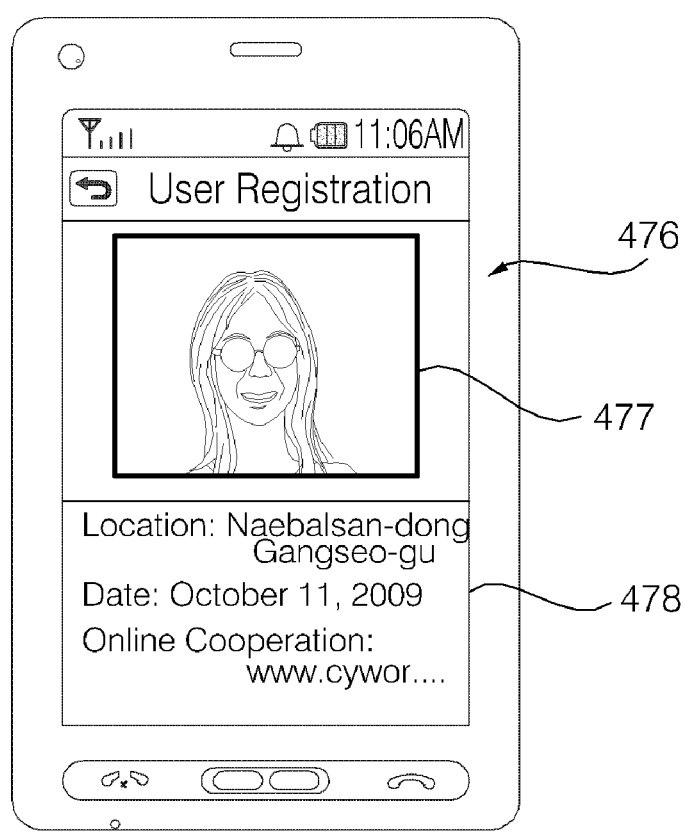

The controller 180 may automatically register, in the online club, a user corresponding to the thumbnail 475 that the user has touched and selected. That is, the controller 180 adds, as a member of the online bicycle club, the user corresponding to the image of the selected thumbnail 475 shown in FIG. 23c. FIG. 23d illustrates a club member registration screen 476 that the controller 180 displays on the display unit 151.

The registration screen 476 includes a photograph 477 of the member and text 478 corresponding to information of the member. In this embodiment, the controller 180 records, as information of the registered member, the position and date and time where and when the photograph was taken. The controller 180 also stores an online address of the club in which the member has been registered using the taken photograph. The controller 180 may also upload the newly registered member's photograph to the stored online address.

FIGS. 23a to 23d sequentially illustrate processes in which the user takes their photograph, registers as a new member in the online club using the photograph, and uploads the photograph to the club site. In another example, when the user has taken a photograph, the mobile terminal of this embodiment may automatically upload the photograph to a predetermined online site or may automatically register the user corresponding to the photograph as a member even when no command has been input to the mobile terminal.

Figure 24A:
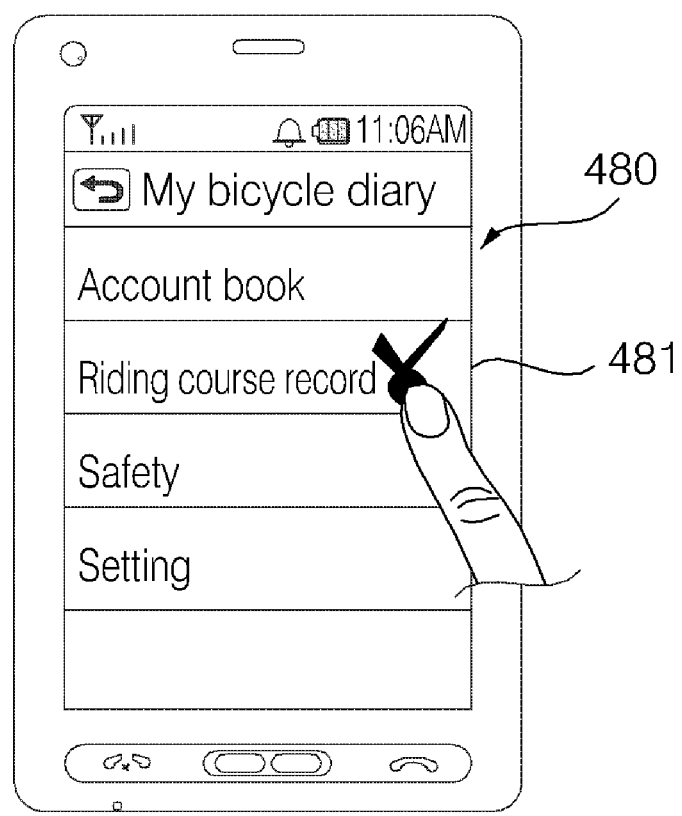
Figure 24B:
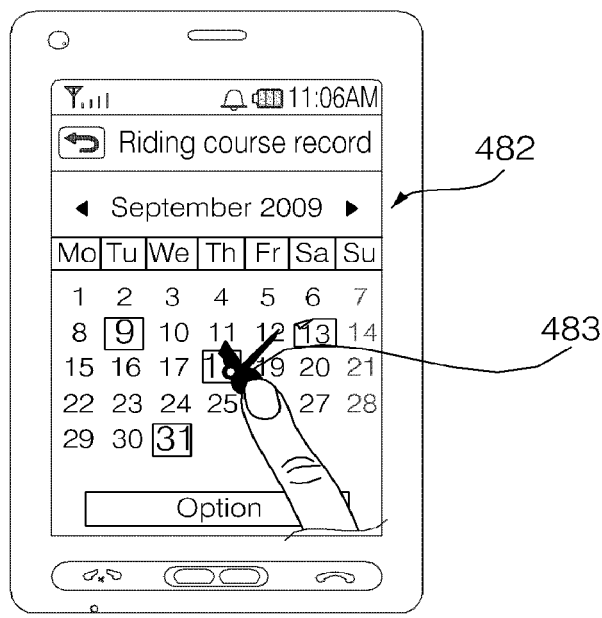
Figure 24C:
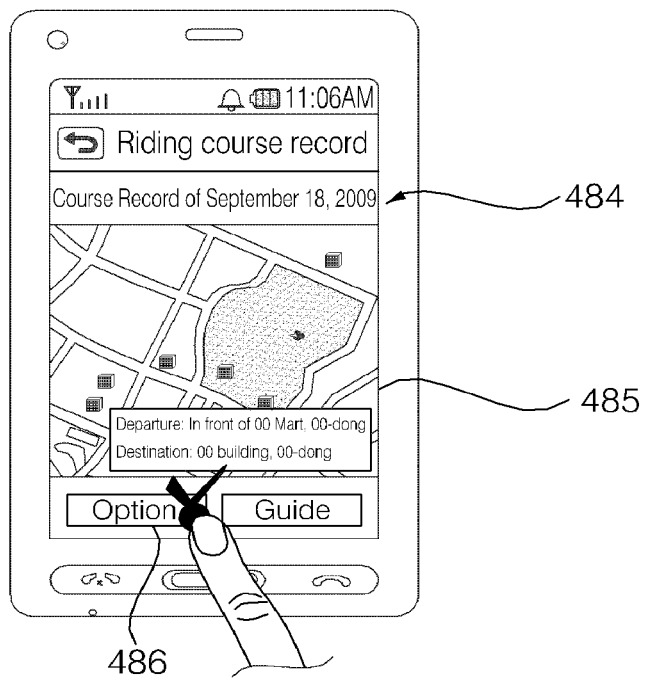

FIGS. 24a to 24c illustrate screens displayed on a mobile terminal according to a 21st embodiment of the present invention.

In this embodiment, the user may check a previous riding record using a bicycle management diary program which is one of a variety of bicycle riding applications. As shown in FIG. 24a, the controller 180 displays a bicycle management diary program screen 480 on the display unit 151. The user may touch and select an item 481 corresponding to input of a command to check previous riding information on the bicycle management diary program screen 480.

Figure 25A:
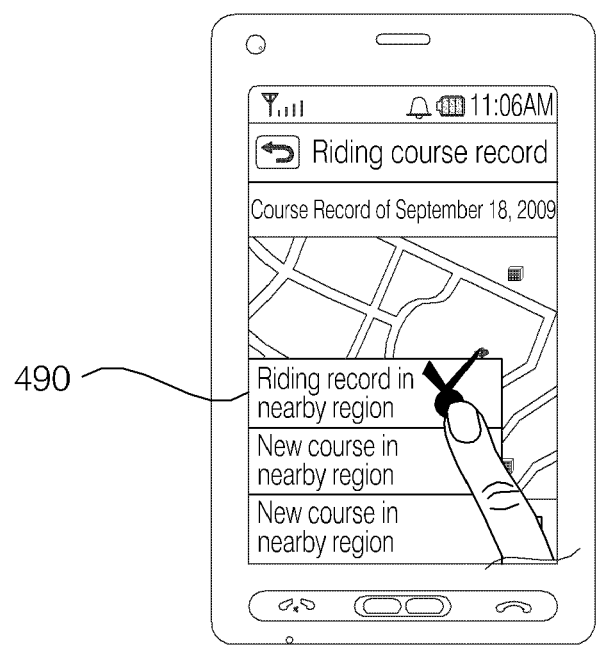
Figure 25B:
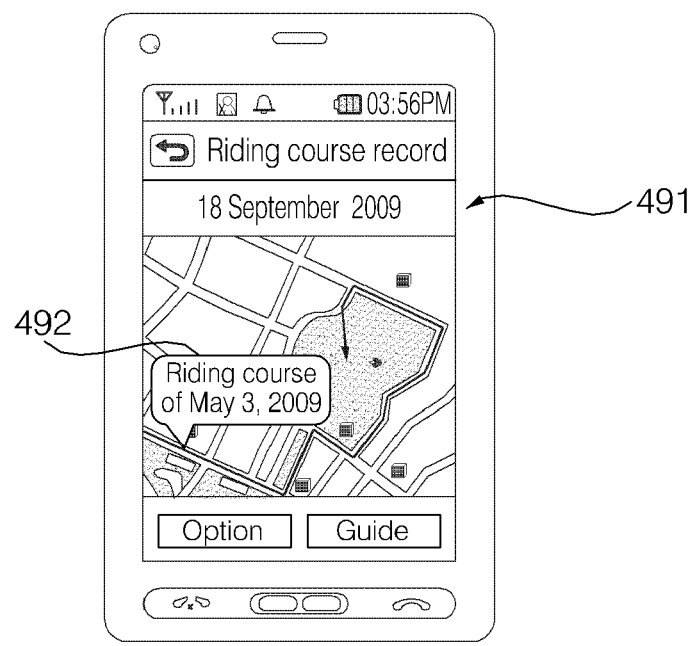

In response to the command that the user has input to the mobile terminal 100, the controller 180 displays, on the display unit 151, a calendar screen 482, in which dates when records of riding of the bicycle by the user were stored are marked, as shown in FIG. 25b. The user may select an item 483 corresponding to a date, the riding record of which the user desires to check, on the calendar screen 482.

The controller 180 displays a riding record screen 484 corresponding to the date, the riding record of which the user desires to check, on the display unit 151 as shown in FIG. 24c. In this embodiment, the controller 180 displays a map screen 485 including information of a riding course of the bicycle and text indicating the course information on the display unit 151. The user may touch and select an option icon 486 displayed on the 151 to input a command to check more detailed riding records to the mobile terminal 100.

FIGS. 25a and 25b illustrate screens displayed on a mobile terminal according to a 22nd embodiment of the present invention.

In this embodiment, the mobile terminal 100 may determine a region where the user is located and call a previous riding record of the region. The mobile terminal may also determine a region where the user is located and recommend a bicycle riding course near the region. The user may touch an item 490, which enables input of a command to view a previous riding record of the current region, in a popup window as shown in FIG. 25a.

In response to touching of the item 490 by the user, the controller 180 displays a previous riding record screen 491 corresponding to the region on the display unit 151 as shown in FIG. 25b. The previous riding record screen 491 may include a map indicating information of a course which the user has ridden in the past and a popup window 492 indicating related information.

As is apparent from the above description, a mobile terminal and a method for controlling the operation of the same according to the present invention have a variety of advantages. For example, a bicycle riding application can be executed by the mobile terminal. When the bicycle riding application is executed by the mobile terminal, the mobile terminal can display bicycle riding course information or other bicycle user position information. This allows the user to select bicycle riding course information or to ride with other bicycle users, thereby improving bicycle riding efficiency.

The mobile terminal and the method of controlling the operation of the same according to the present invention are not limited in their applications to the configurations and methods of the embodiments described above and all or some of the embodiments may be selectively combined to implement various modifications.

The method for controlling the mobile terminal according to the present invention can be embodied as processor readable code on a processor readable medium provided in a mobile terminal. The processor readable medium includes any type of storage device that stores data which can be read by a processor. Examples of the processor readable medium include Read-Only Memory (ROM), Random-Access Memory (RAM), CD-ROMs, magnetic tape, floppy disks, optical data storage devices, and so on. The processor readable medium can also be embodied in the form of carrier waves as signals transmitted over the Internet. The processor readable medium can also be distributed over a network of coupled processor systems so that the processor readable code is stored and executed in a distributed fashion.

Although the present invention has been illustrated and described above with reference to the specific embodiments, the present invention is not limited to the specific embodiments and it will be apparent to those skilled in the art that various modifications can be made to the embodiments without departing from the scope of the present invention as disclosed in the accompanying claims and such modifications should not be construed as departing from the spirit or scope of the present invention.

What is claimed is:

1. A method for controlling operation of a mobile terminal, the method comprising:
    executing a bicycle riding application;
    determining current position information;
    determining position information of a different bicycle user registered in the bicycle riding application;
    displaying a navigation screen indicating the current position information or the position information of the different bicycle user on the display unit; and
    comparing at least one of a riding speed, a riding time, and a riding distance of the bicycle on which the mobile terminal is installed with a corresponding one of a riding speed, a riding time, and a riding distance of the different bicycle user and outputting a result of the comparison.

2. The method according to claim 1, further comprising: determining current weather information,
wherein bicycle riding course information that changes according to the determined weather is displayed on the navigation screen.

3. The method according to claim 1, wherein the navigation screen is a screen including a virtual reality corresponding to information of a course to be traveled by a bicycle on which the mobile terminal is installed.

4. The method according to claim 1, wherein position information of the different bicycle user is virtually calculated at the mobile terminal.

5. The method according to claim 1, further comprising: displaying a bicycle riding guide screen corresponding to the result of the comparison.

6. The method according to claim 1, wherein the position information of the different bicycle user is position information of another mobile terminal which can transmit and receive wireless signals to and from the mobile terminal.

7. The method according to claim 1, further comprising: detecting a riding speed of the bicycle; and
executing a function to automatically read a received message when the detected riding speed of the bicycle is equal to or greater than a reference value.

8. The method according to claim 1, further comprising: capturing surroundings; and
transmitting a captured still or moving surroundings image to another mobile terminal or a server.

9. The method according to claim 1, further comprising: setting an anti-theft lock function; and
if the mobile terminal is unlocked, sending a theft message including the current position information of the bicycle.

10. The method according to claim 1, further comprising: detecting a distance between a neighboring object and the bicycle; and
if the distance is less than a reference value, outputting a warning sound.

11. The method according to claim 1, further comprising: selecting a menu corresponding to a previous riding information;
displaying a calendar screen, in which dates when records of riding of the bicycle were stored are marked;
selecting the date on the calendar screen; and
displaying a riding record screen corresponding to the selected date.

12. The method according to claim 11, wherein the riding record screen includes a map screen indicating a riding course and information of the riding course.

13. The method according to claim 1, further comprising: displaying a recommend list of riding course based on the current position information.

14. A mobile terminal comprising:
a display unit; and
a controller for determining, when a bicycle riding application is executed, current position information, determining position information of a different bicycle user registered in the bicycle riding application, and displaying a navigation screen indicating the current position information or the position information of the different bicycle user on the display unit,
wherein the controller compares at least one of the riding speed, the riding time, and the riding distance of the bicycle on which the mobile terminal is installed with a corresponding one of the riding speed, the riding time, and the riding distance of the different bicycle user and displays a bicycle riding guide screen corresponding to a result of the comparison on the display unit.

* * * * *